(12) United States Patent
Govindassamy

(10) Patent No.: US 10,736,005 B1
(45) Date of Patent: Aug. 4, 2020

(54) METHOD AND APPARATUS FOR INTERNET BASED WIRELESS COMMUNICATION FOR NETWORKS

(71) Applicant: MBIT WIRELESS, INC., Irvine, CA (US)

(72) Inventor: Sivakumar Govindassamy, Irvine, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 66 days.

(21) Appl. No.: 15/903,582

(22) Filed: Feb. 23, 2018

(51) Int. Cl.
| | |
|---|---|
| H04W 36/00 | (2009.01) |
| H04W 36/08 | (2009.01) |
| H04W 68/00 | (2009.01) |
| H04W 36/04 | (2009.01) |
| H04W 88/16 | (2009.01) |

(52) U.S. Cl.
CPC ....... *H04W 36/0083* (2013.01); *H04W 36/04* (2013.01); *H04W 36/08* (2013.01); *H04W 68/005* (2013.01); *H04W 88/16* (2013.01)

(58) Field of Classification Search
None
See application file for complete search history.

(56) References Cited

U.S. PATENT DOCUMENTS

| | | | |
|---|---|---|---|
| 8,964,614 B1 | 2/2015 | Hassan et al. | |
| 2003/0162549 A1* | 8/2003 | Carlsson | H04W 88/02 455/456.2 |
| 2007/0298725 A1 | 12/2007 | Ryu | |
| 2014/0269611 A1 | 9/2014 | Ionescu et al. | |
| 2014/0337935 A1 | 11/2014 | Liu et al. | |
| 2015/0094114 A1 | 4/2015 | Rao et al. | |
| 2015/0327129 A1* | 11/2015 | Faccin | H04W 36/0055 370/331 |
| 2016/0345262 A1 | 11/2016 | Jain et al. | |
| 2016/0345345 A1 | 11/2016 | Malik et al. | |
| 2017/0086131 A1 | 3/2017 | Gupta | |
| 2017/0181153 A1 | 6/2017 | Choi et al. | |
| 2018/0242189 A1* | 8/2018 | Wang | H04W 72/1284 |
| 2018/0262465 A1* | 9/2018 | Maattanen | H04W 12/02 |
| 2018/0310145 A1* | 10/2018 | Bitra | H04W 4/90 |

* cited by examiner

*Primary Examiner* — Scott M Sciacca
(74) *Attorney, Agent, or Firm* — Lerner, David, Littenberg, Krumholz & Mentlik, LLP

(57) ABSTRACT

Client devices may have internet and other services available simultaneously from a number of different networks such as wide area mobile broadband networks and local area networks such as Wi-Fi and Ethernet. In cases where a client device is receiving internet service from a local area network, the client device may still need to maintain the communication link with a wide area mobile broadband network even when not actively using its services. A method and apparatus are disclosed that enable a client device with mobile broadband connection capability and at least one local area connection capability to power off its mobile broadband modem but still be connected to mobile broadband network through the internet service which the client device may receive from the local area network. Powering off the mobile broadband modem of a client device may help reduce its power consumption.

25 Claims, 20 Drawing Sheets

FIG. 20

```xml
<?xml version="1.0"?>
<CellInformation>
    <PLMN id="PLMN101">
        <Frequency id="Freq101">
            <Cell id="Cell101">
                <TracID>TAC101</TracID>
                <SIB1>SIBParam101</SIB1>
                <SIB2>SIB2Praram101</SIB2>
                <Client ID="Client101">
                    <MACAddress>MACID101</MACAddress>
                    <IPAddress>IP101.102.103.104</IPAddress>
                    <IMSI>IMSI101</IMSI>
                </Client>
                <Client ID="Client102">
                    <MACAddress>MACID102</MACAddress>
                    <IPAddress>IP102.103.104</IPAddress>
                    <IMSI>IMSI102</IMSI>
                </Client>
            </Cell>
        </Frequency>
    </PLMN>
</CellInformation>
```

METHOD AND APPARATUS FOR INTERNET BASED WIRELESS COMMUNICATION FOR NETWORKS

BACKGROUND

A client device as defined in the present disclosure is a device that may access voice, video, text, instant messaging, internet and other services from a number of sources including wireless communication networks, Wi-Fi, Ethernet, etc. Such client devices may include conventional devices such as a smartphone, a tablet, a feature-phone, a laptop or a desktop personal computer, etc. Other client devices may include devices that are embedded within devices that perform other functions such as an entertainment system in a home or in an automobile, a home appliance such as a refrigerator or washer/dryer, a wristwatch with a heart rate monitor, a medical device such as a blood pressure meter or insulin sensor, a utility meter, a gaming console, a camera, a navigation device, an industrial equipment, etc.

The wireless communication networks are often referred to as Wireless Wide Area Network (WWAN). The internet service offered by such networks is often referred to as mobile broadband internet or Mobile Broadband (MB) and the WWANs are often referred to as mobile broadband networks. The terms WWAN and MB are used interchangeably herein. An example of a mobile broadband network may be based on the Long Term Evolution (LTE) from the 3rd Generation Partnership Project (3GPP). The LTE technology and its evolution are often referred to as fourth generation (4G) technologies. A client device may also use any of the previous generation technologies such as "2G", "3G" from 3GPP and other standardization bodies. A client device and a network may also use future generation technologies for current and new services. A WWAN operator may deploy multiple Radio Access Technologies (RATs) such as 3GPP LTE, 3GPP Universal Mobile Telecommunications Service (UMTS), Global System for Mobile communication (GSM), Code Division Multiple Access (CDMA), Evolution Data Only/Evolution Data Optimized (EVDO), etc. Different client devices with different capabilities may connect to the WWAN using different suitable RATs for getting internet service. There may be one or more WWAN operators providing service in a particular geographic area. Each WWAN operator may use the same or different types of RATs. For providing end-to-end services, a WWAN many include, in addition to RATs, other network elements such as gateways and interfaces with other networks. Some client devices may have capability of supporting multiple Subscriber Identity Modules (SIMs) corresponding to different WWAN internet service providers. Some client devices with multiple SIMs may be able to get internet service from multiple WWANs simultaneously.

Typically, as shown in FIG. 1, a WWAN comprises one or more base stations.

Other network devices may also be employed, such as a mobile switching center (not shown). As illustrated in FIG. 1, the communication path from the base station (BS) to the client device or mobile station (MS) is referred to herein as a downlink (DL) direction or downlink channel. The communication path from the client device to the base station is referred to herein as an uplink (UL) direction or uplink channel. In some wireless communication systems, the client device communicates with the BS in both the DL and UL directions. For instance, such communication is carried out in cellular communication systems. In other wireless communication systems, the client device communicates with the base stations in only one direction, usually the DL. Such DL communication may occur in applications such as paging. Typically in a wireless communication system, the client device and the base station may transmit information in blocks of data and such a block of data is referred herein as a "message."

A base station to which a client device may be downlink synchronized and/or communicating at any given time is referred herein as the Serving Base Station (SBS). In some wireless communication systems the serving base station may be referred to as the serving cell. The base stations that are in the vicinity of the serving base station are called Neighbor Base Stations (NBS). Similarly, in some wireless communication systems a neighbor base station may be referred to as a neighbor cell.

A client device, after initially synchronizing with a cell, may switch to another cell depending on the signal conditions, network congestion, and other criteria. The process of switching from one cell to another cell by a client device is often referred to as handover (HO) or cell reselection. In some wireless communication systems handover is also referred to as handoff. Also in some wireless communication systems cell reselection is also referred to as idle mode handoff. An NBS, to which a client device may be switching over its communication from the current SBS, is herein referred to as Target Base Station (TBS). In some wireless communication systems, a target base station is normally referred to as a target cell. Sometimes, during a handover, the serving cell and the target cell may be the same and only the channel used for communication may be changed. Such a handover, in which the cell is not changed, is called as an intra-cell handover. The purpose of intra-cell handover may be that the new channel is better suited for communication than the previous channel within the same cell. Cell reselections or handovers amongst cells that use the same frequency are referred herein as intra-frequency cell reselection or handover. Cell reselections or handovers amongst cells that use different frequencies are referred herein as intra-frequency cell reselection or handover. A network may use different Radio Access Technologies (RATs) for providing various services. In a particular network, the cells of different RAT types may be overlapping or adjacent to each other. If a neighbor cell is using a RAT type that is different from the RAT type used by the serving cell, it is referred to as an inter-RAT neighbor cell.

The decision making process for handovers and cell reselections varies from one wireless communication system to another. However, the decisions are generally based on the signal conditions measurements by the client devices and reporting of those measurements to the wireless communication network by the client devices. The wireless communication network generally may influence and control the measurements and reporting process of the client device by providing parameters for the measurement and reporting process. The actual decision to perform handover may be made either by the wireless communication network or by the client device depending on the type of particular wireless communication system. On the other hand the cell reselection decisions in idle mode (i.e., when client device is not in active communication with the wireless communication network) may be generally performed autonomously by the client device. Both handovers and cell reselections may normally lead to change of cell from which the client device may access communication services. The difference between the handover procedure and cell reselection procedure may depend generally on whether a client device is engaged in an active communication with the wireless communication network. The measurements may include the Received Signal Strength Indicator (RRSI), Signal-to-Noise and Interference Ratio (SINR), the physical identities of one or more cells that may be visible or detectable by a client device, the difference between the timing of the current cell on which a client device may be camped and the timing of the neighbor cells. For example, in case of 3GPP LTE, the measurements may include Reference Signal Received Power (RSRP), Reference Signal Received Quality (RSRQ), Physical Cell Identity (PCI), etc.

Normally, certain types of system information may be required by all client devices so that they may communicate with the wireless communication network. The system information typically includes system synchronization information, system parameters, resource allocation information, paging information, etc. The wireless communication network may transmit such system information as broadcast data so that all client devices within its coverage area may be able to receive that information. Such information is herein referred to as "broadcast messages."

Typically in a wireless communication system a base station may group the system information and each group of system information may be transmitted as multiple broadcast messages and such broadcast messages are herein referred as "system parameter messages." The system parameter messages may carry important system information without which the client device may not be able to communicate with the wireless communication network. The wireless communication network may transmit these system parameter messages at regular intervals in such a way that any client device that enters its coverage area may receive these system parameter messages and may be able to communicate with the wireless communication network at the earliest possible time. Client devices that are already in the base station's coverage area may also periodically receive these system parameter messages for possible updates. Normally a client device may store the system parameter messages in its memory for the current SBS.

Typically, in wireless communication systems, most of the system parameter messages may not change frequently. For example, some system parameter messages may change once or twice a day and some system parameter messages may not change for many days.

In some wireless communication systems, when a client device switches to a new base station due to cell reselection or handover, it may be required to receive the system parameter messages for the new SBS and certain system parameter messages for the selective list of NBSs corresponding to the new SBS.

The set of all system parameter messages broadcast by a base station is herein referred to as "base station broadcast system information." The individual block of system information message may be referred to as "System Information Block (SIB)." Two or more SIBs may be grouped and sent as a single System Information (SI) message. There may be different SIBs describing different groups of system parameters such as SIB Type1 (SIB1), SIB Type2 (SIB2), etc. The SI for one or more cells may be periodically updated by the network. To ensure that the client devices are using the correct version of the SI, a field referred herein as "change-mark" is generally included in the SI messages. A client device may store the change-mark of the SIs it has decoded. If the new SI is transmitted by a cell, it may increment the change-mark to enable the client terminal to detect that it needs to acquire the newly updated SI. The change-mark of the newly acquired SI is then used as latest version for detecting any future changes in the SI. The change-mark field may be incremented in modulo arithmetic to keep the field bit-width to a minimum. For example, the change-mark may be incremented modulo-8 and the value may be represented by a 3-bit wide field.

In idle mode, a client device for the most part may turn off a majority of its circuitry to reduce power consumption. This is often referred to as "sleep" state, a sub-state within the idle mode. A client device may remain in a sleep state for a long duration and may wake up at the desired time window where it expects to receive the paging messages and certain SIBs. This alternating sequence of sleep and wake-up in idle mode is referred herein as Discontinuous Reception (DRX). The sleep and wake-up sequence may follow regular pattern and its period is often referred to as DRX cycle. The success rate for the incoming calls (e.g., mobile terminated voice calls and/or data calls) in a client device is directly related to the successful reception of paging messages. Normally, in idle mode, in addition to the reception of paging messages and SIB messages, a client device may continue to search and monitor neighbor cells. In connected mode, a client device may be actively engaged in communication with the network for data transfer in downlink, uplink, or both directions.

When a client device attempts to perform a network registration procedure to get service from a cell, it first decodes the system information broadcast in the cell. The client device may store such system information. The system information carries important information regarding the cell reselection criteria. Such information may include but not limited to the Tracking Area Identity (TAI), Public Land Mobile Network Identity (PLMN ID) which uniquely identifies a particular network operator, Closed Subscriber Group Identity (CSG ID), RAT type, neighbor cell frequencies, etc. This information may help to decide whether a cell is a "suitable cell" for the client device to avail all the services offered by it, or the cell is an "acceptable cell" where the client device may avail only limited services such as emergency calls. The client device may have to perform the network registration procedure to get service from the network and for the network to be able to page the client device for mobile terminated (incoming) calls. The network registration procedure may be typically performed by a client device with a particular cell. A group of cells in the geographic vicinity of each other may form a registration area. A registration area may be identified based on the system information of a cell. For example, the tracking area of a group of cells in a registration area may be the same.

Each base station in a wireless communication network may be identified by a unique identifier referred to herein as Cell Identity (CID). The CID of a base station may become known to a client device when it decodes SI from the base station. To avoid unnecessary updates from a client device and yet ensure the ability to reach a client device at any given time, the network may organize a group of cells into a "tracking area" and use a TAI to identify the various groups of cells. This is shown in FIG. 2 where four different tracking areas are illustrated. A cell may broadcast information about the tracking area it belongs to by including the TAI information in the system information. A client device may be required to inform the network when it begins to receive service from a cell that belongs to a tracking area that is different from the tracking area of the cells from which it was previously receiving service. The process of informing the network that the client device has begun receiving service from a cell that belongs to a new tracking area is referred herein as Tracking Area Update (TAU) procedure. With this method, a client device may perform TAU only when there is a change in TAI of the cell from which it is getting service. For example, in FIG. 2, when a client device reselects from the cell with CID=1003 to the cell with CID=1007 which has the same TAI, it may not perform TAU procedure. However, when the client device reselects from the cell with CID=1007 and TAI=200 to the cell with CID=1012 and TAI=201, it may perform TAU procedure.

Different client devices may be identified using their respective unique identities. For example, International Mobile Subscriber Identity (IMSI), Temporary Mobile Subscriber Identity (TMSI), the Media Access Control (MAC) address, the Internet Protocol (IP) address may be used for the identity. Regardless of any particular identity used, it is generically referred herein as Client Device Identity (CDI).

As long as a client device is in the same registration area, the client device may not perform network registration procedure again except that a periodic network registration update procedure may need to be performed even if the client device continues to be stationary or move within the same registration area. If the client device moves to a cell which does not belong to the registration area in which the client device is registered, then the client device may perform network registration procedure to continue to access service from the network. Similarly, as long as a client device is in the same TAI, the client device may not perform TAU procedure again except that a periodic TAU procedure may need to be performed even if the client device continues to be stationary or move within the same TAI.

When a client device is in idle mode, the network may only be aware of the location of the client device at the registration area level. In order for a network to page a client device, it may need to send the paging message in all cells belonging to the same registration area. The instances for paging message transmission, known as paging occasions (POs), are usually derived based on a client device's unique identity and the paging cycle. The network may transmit a paging message addressed to a specific client device in its specific PO. When a client device performs cell reselection, the exact instances of paging occasions may be different in the new serving cell. Depending on the exact timing of the cell reselection and the timing of the POs in the old serving cell and the new serving cell, the client device may potentially miss a paging message or may receive it with delay. A single paging message received in a single PO may include multiple paging records to page multiple client devices. Different client devices may be identified within a paging message by using their respective unique identities in the paging records. For example, International Mobile Subscriber Identity (IMSI) may be used for the identity, or in case of 3GPP LTE wireless communication system, System Architecture Evolution (SAE)-Temporary Mobile Subscriber Identity (S-TMSI) may be used.

Internet service has become ubiquitous and the means by which it is obtained varies widely. For example, internet service may be provided through a Digital Subscriber Line (DSL), a Data over Cable Service Interface Specification (DOCSIS) based internet service over cable television system (Cable Modem), a fiber optic network, a WWAN, a satellite communication network, etc. When the internet service provides high data transfer rates it is often referred to as broadband internet service. Broadband internet service is generally understood to be a service that is always on and offers data transfer rates on the order of mega-bits per second or higher for both downlink and uplink.

A client device may use internet service from one or more of the available internet service sources. A client device may access the internet service directly through one of the primary sources of internet service as mentioned earlier. Alternatively, a client device may access the internet service through a local network, which may perform distribution of the primary internet service to the users localized in a given area. Examples of such local networks include Local Area Network (LAN) using Ethernet, Wireless LAN (WLAN) commonly known as Wi-Fi, Bluetooth™, Zigbee or some other local area networking schemes. The wireless local networking schemes are collectively referred herein as Short Range Wireless Link (SRWL). The wire-line local networking schemes, such as DSL, Cable Modem, Ethernet, etc. are collectively referred herein as Short Range Cabled Link (SRCL). Both the SRWL and SRCL together are referred to as Short Range Link (SRL). When a client device is in proximity of a location where an SRL access is available, it may access the internet service using the SRL. FIG. 3 illustrates an example scenario of client devices accessing the internet service over a WLAN SRWL that is connected to a traditional wire-line internet service such as a DSL or a DOCSIS Cable Modem. The local area where WLAN service is available is often referred to as a Hotspot. The device that offers the WLAN service in a given local area is referred to as an Access Point (AP). In the present disclosure, the terms Hotspot AP or Hotspot are used interchangeably to refer to the device that offers the WLAN service in a given local area.

A Hotspot AP may be connected to the DSL or DOCSIS Cable Modem through any of the standardized interfaces such as Universal Serial Bus (USB), Ethernet, or proprietary interfaces. In some cases, the DSL or DOCSIS Cable Modem and the Hotspot AP may be part of a single physical device. In such cases, the interface between the DSL or DOCSIS Cable Modem and AP may use Secure Digital Input Output (SDIO) or another suitable interface.

As the variety of client devices has increased and the demand for MB service has increased, a device known as a mobile Hotspot is commonly used. A mobile Hotspot device includes both a modem for WWAN and a WLAN AP (Hotspot AP) to distribute the internet service to local client devices. FIG. 4 illustrates the block diagram of an example mobile Hotspot device. As shown in FIG. 4, for the chosen example, the WWAN modem and the Hotspot AP may be connected to each other via one of the standard interfaces used in the industry such as USB, SDIO, or proprietary interfaces. In another mobile Hotspot example, the WWAN modem and the WLAN AP may be an Integrated Circuit (IC) as shown in FIG. 5.

Some client devices have capability to connect with number of different sources of internet service. For example, a client device may have a WWAN modem that may be used to get mobile internet service directly from the mobile broadband network as illustrated in FIG. 6. The flow of data as shown in FIG. 6 is from the mobile broadband modem to the application processor which processes the download and upload application data and interacts with the user via the display and other elements of the user interface such as touch-screen, camera, microphone, speaker, vibrator, etc. The client device may also have a WLAN modem to access internet service over a Hotspot AP. When it is near a Hotspot AP, it may use internet service from a Hotspot as illustrated in FIG. 3. In that case the flow of data is as shown in FIG. 7 from the internet to the DSL or Cable Modem to the Hotspot AP and then to the WLAN modem and on to the application processor which processes the download and upload application data and interacts with the user via the display and other elements of the user interface such as touch-screen, camera, microphone, speaker, vibrator, etc. in the client device.

When a client device is connected to an SRL such as the WLAN for internet service, it may continue to maintain its link with the WWAN for services other than internet service. For example, a voice call or a video call to or from the phone number associated with the client device may be enabled through the WWAN while the internet service may be accessed through WLAN. The maintenance of the link with the WWAN may not necessarily require an active connection (a call or an internet service), but it may involve a number of procedures that a client device may need to perform. A client device may need to continue to receive paging messages from the WWAN in order to receive any incoming voice or video calls. A client device may need to perform measurements on SBS and NBSs as well as decode the SI from the SBS and some of the NBSs. A client device may need to perform TAU procedure with the WWAN whenever it reselects to a neighbor cell with a TAI different from a TAI of its current serving cell. A client device may need to perform registration procedure with the WWAN when it reselects to a cell in a different registration area or when a periodic registration update is required. Collectively, all the procedures performed by a client device in idle mode with WWAN are referred to as idle Radio Resource Management (RRM) procedures. In FIG. 7, the link between the WWAN modem of a client device and the WWAN is maintained for the purposes mentioned above, even when the client device is getting internet service from the WLAN.

SUMMARY

A method and apparatus are disclosed that enable a client device with WWAN capability and at least one SRL capability to power off its WWAN modem but still communicate to the WWAN through the internet service which the client device may receive from the SRL.

In accordance with an aspect of the present disclosure, a method for internet based wireless communication may include: controlling, by a processing device at a Wireless Wide Area Network (WWAN), establishing an Internet Based Idle (IBI) mode of operation with a client device connectable to the WWAN for obtaining internet service, when the client device has internet service through an another network other than the WWAN, wherein the establishing the IBI mode includes receiving, from the client device through a Radio Access Technology (RAT) and a serving Gateway (GW) of the WWAN, first information about a current internet connection of the client device with the another network, and a request for the WWAN to enter the IBI mode to perform an idle Radio Resource Management (RRM) procedure via the internet service of the another network; determining whether to accept, modify or reject the request to enter the IBI mode; responding to the request to enter the IBI mode with a response transmitted over at least one of the WWAN or the another network; and receiving a confirmation message from the client device for the response over at least one of the another network or the WWAN, in which, in the establishing the IBI mode or in the IBI mode, communication between a Packet Data Network (PDN) GW of the WWAN and a PDN GW of the another network is through an interface between the PDN GW of the another network and the PDN GW of the WWAN.

In one alternative, the method may include controlling, by the processing device, receiving at least one of information about Client Device Identity (CDI) of the client device or a current serving cell identity (CID) of the client device, when the request to enter the IBI mode is received.

In one alternative, when the response is to accept or modify the request to enter the IBI mode, the response may be transmitted at least through the another network.

In one alternative, the method may include controlling, by the processing device, when a message transmission failure is determined at the WWAN for a given message from the WWAN and the given message has been transmitted less than a predetermined number of times, re-transmitting the given message.

In one alternative, the given message may be re-transmitted based on expiry of a timer which is started at time of a previous transmission of the given message.

In one alternative, the method may include controlling, by the processing device, when in the IBI mode, initiating a given communication with the client device through the another network.

In one alternative, the method may include controlling, by the processing device, when in the IBI mode, transmitting a paging message to the client device through the another network.

In one alternative, the method may include controlling, by the processing device, synchronizing with the client device and, when the client device and the WWAN are synchronized, receiving a response to the paging message according to a given RAT of the WWAN.

In one alternative, the method may include controlling, by the processing device, transmitting to the client device second information including details about a dedicated uplink resource in which the client device is to perform a procedure for paging response.

In one alternative, the method may include controlling, by the processing device, during the establishing the IBI mode, negotiating with the client device whether the client device is to wait for dedicated resource allocation for paging response or to initiate a contention based random access procedure in an uplink to the WWAN for responding to the paging message.

In one alternative, the processing device may be a Network IBI (NIBI) Controller in the PDN GW of the WWAN.

In one alternative, the method may include controlling, by the processing device, for the IBI mode, establishing a first logical connection of the NIBI Controller with a Client IBI (CIBI) controller of the client device, through the serving GW and the RAT of the WWAN and a WWAN modem of the client device.

In one alternative, the first logical connection may be based on Internet Protocol (IP) data packets or a predetermined IP.

In one alternative, the method may include controlling, by the processing device, in the IBI mode, establishing a second logical connection of the NIBI Controller with the CIBI controller of the client device, through the PDN GW, one of a Digital Subscriber Line Access Multiplexer (DSLAM), a Broadband Remote Access Server (BRAS) and a Cable Modem Termination System (CMTS), and a Hotspot Access Point of the another network, and a WLAN modem of the client device.

In one alternative, the second logical connection may be based on IP data packets or a predetermined IP.

In one alternative, any given message exchange between the CIBI controller and the NIBI controller may be over one of the first and second logical connections.

In one alternative, when the interface is a direct interface, the establishing the IBI mode may include receiving, from the client device through the RAT and the serving GW of the WWAN, an Internet Protocol (IP) address of the PDN GW of the another network, and in which, in the establishing the IBI mode or in the IBI mode, the communication between the PDN GW of the another network and the PDN of the WWAN is with the PDN GW of the another network at the IP address thereof.

In one alternative, the direct interface may be wireless or wired.

In one alternative, when the interface is indirect and includes an internet network, in the establishing the IBI mode or in the IBI mode, the communication may be between a Network IBI (NIBI) controller as the processing device and the client device, over the internet network and via the PDN GW of the another network and using an Internet Protocol (IP) address of the client device.

In one alternative, the another network may be a Wireless Local Area Network (WLAN).

In one alternative, the method may include controlling, by the processing device, establishing with the client device a Serving WWAN Internet Based Idle (SWIBI) mode of operation when the client device has the internet service through the WWAN, in which in the SWIBI mode, the client device only decodes a dedicated unicast channel from the WWAN and does not decode a broadcast channel for a system information (SI) message or a multicast channel for a paging message from the WWAN.

In one alternative, the method may include controlling, by the processing device, when the client device is in a connected mode with the WWAN and in the SWIBI mode, transmitting, over the internet service from the another network, a given SI message and a given paging message update for at least one of a serving cell of the client device or a given SI message update for a neighbor cell.

In one alternative, the method may include controlling, by the processing device, when the client device is in a connected mode with a given RAT of the WWAN and in the SWIBI mode, transmitting to the client device, over the internet service from the another network, given SI and given paging messages for another RAT of the WWAN.

In accordance with an aspect of the present disclosure, an apparatus for internet based wireless communication may include: circuitry configured to control at a Wireless Wide Area Network (WWAN), establishing an Internet Based Idle (IBI) mode of operation with a client device connectable to the WWAN for obtaining internet service, when the client device has internet service through an another network other than the WWAN, wherein the establishing the IBI mode includes receiving, from the client device through a Radio Access Technology (RAT) and a serving Gateway (GW) of the WWAN, first information about a current internet connection of the client device with the another network, and a request for the WWAN to enter the IBI mode to perform an idle Radio Resource Management (RRM) procedure via the internet service of the another network; determining whether to accept, modify or reject the request to enter the IBI mode; responding to the request to enter the IBI mode with a response transmitted over at least one of the WWAN or the another network; and receiving a confirmation message from the client device for the response over at least one of the another network or the WWAN, in which, in the establishing the IBI mode or in the IBI mode, communication between a Packet Data Network (PDN) GW of the WWAN and a PDN GW of the another network is through an interface between the PDN GW of the another network and the PDN GW of the WWAN.

In accordance with an aspect of the present disclosure, a wireless communication device at a Wireless Wide Area Network (WWAN) may include a receiver to receive a wireless communication; and a processing device configured for internet based wireless communication, wherein the processing is configured to control at the WWAN, establishing an Internet Based Idle (IBI) mode of operation with a client device connectable to the WWAN for obtaining internet service, when the client device has internet service through an another network other than the WWAN, wherein the establishing the IBI mode includes receiving, from the client device through a Radio Access Technology (RAT) and a serving Gateway (GW) of the WWAN, first information about a current internet connection of the client device with the another network, and a request for the WWAN to enter the IBI mode to perform an idle Radio Resource Management (RRM) procedure via the internet service of the another network; determining whether to accept, modify or reject the request to enter the IBI mode; responding to the request to enter the IBI mode with a response transmitted over at least one of the WWAN or the another network; and receiving a confirmation message from the client device for the response over at least one of the another network or the WWAN, in which, in the establishing the IBI mode or in the IBI mode, communication between a Packet Data Network (PDN) GW of the WWAN and a PDN GW of the another network is through an interface between the PDN GW of the another network and the PDN GW of the WWAN.

BRIEF DESCRIPTION OF THE DRAWINGS

FIG. 20 illustrates an example eXtensible Mark-up Language (XML) file that may be used by WWAN or web server according to the aspects of the present disclosure.

DETAILED DESCRIPTION

Figure 1:
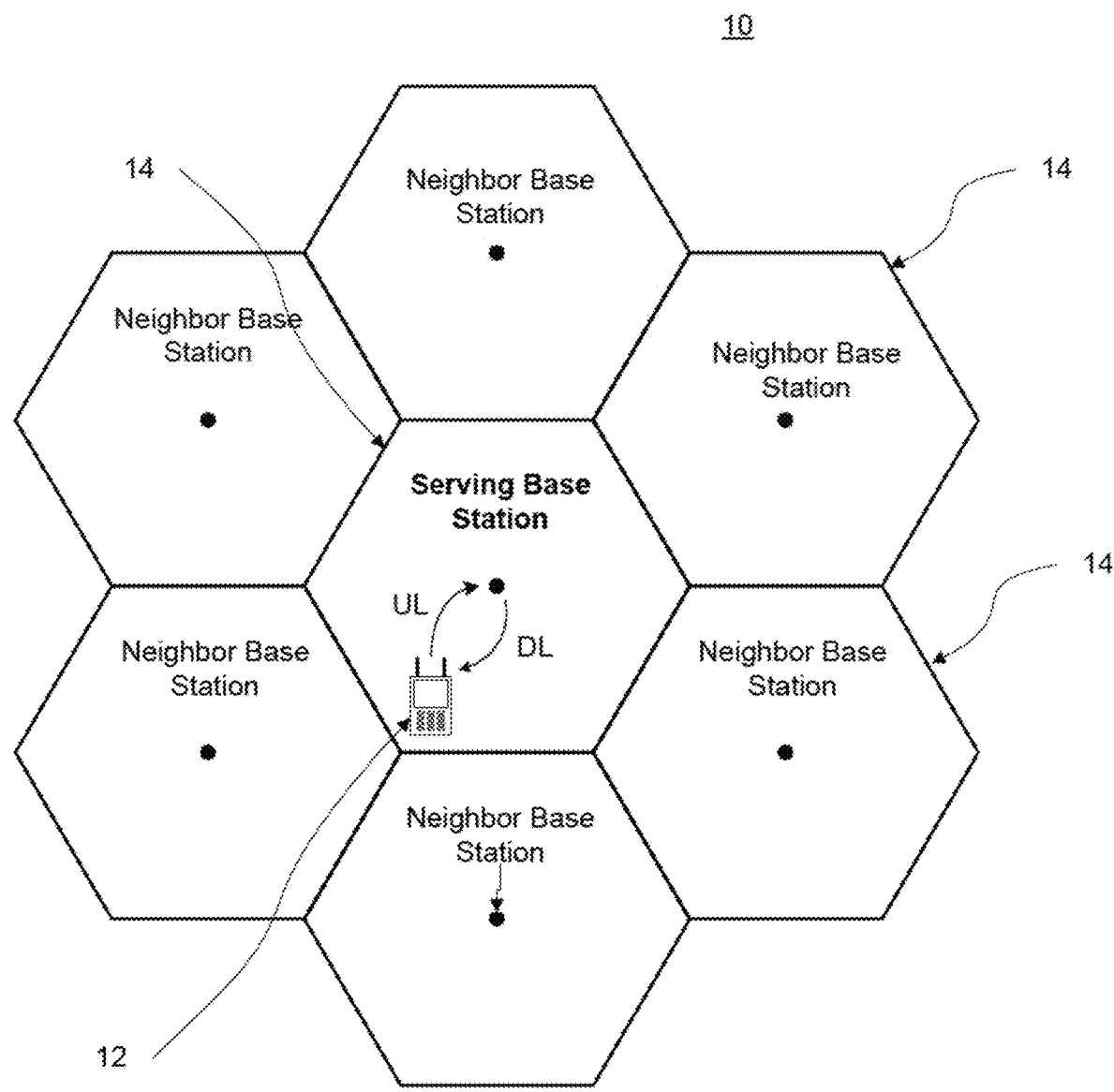
FIG. 1 illustrates a conventional mobile wireless communication system.
Figure 2:
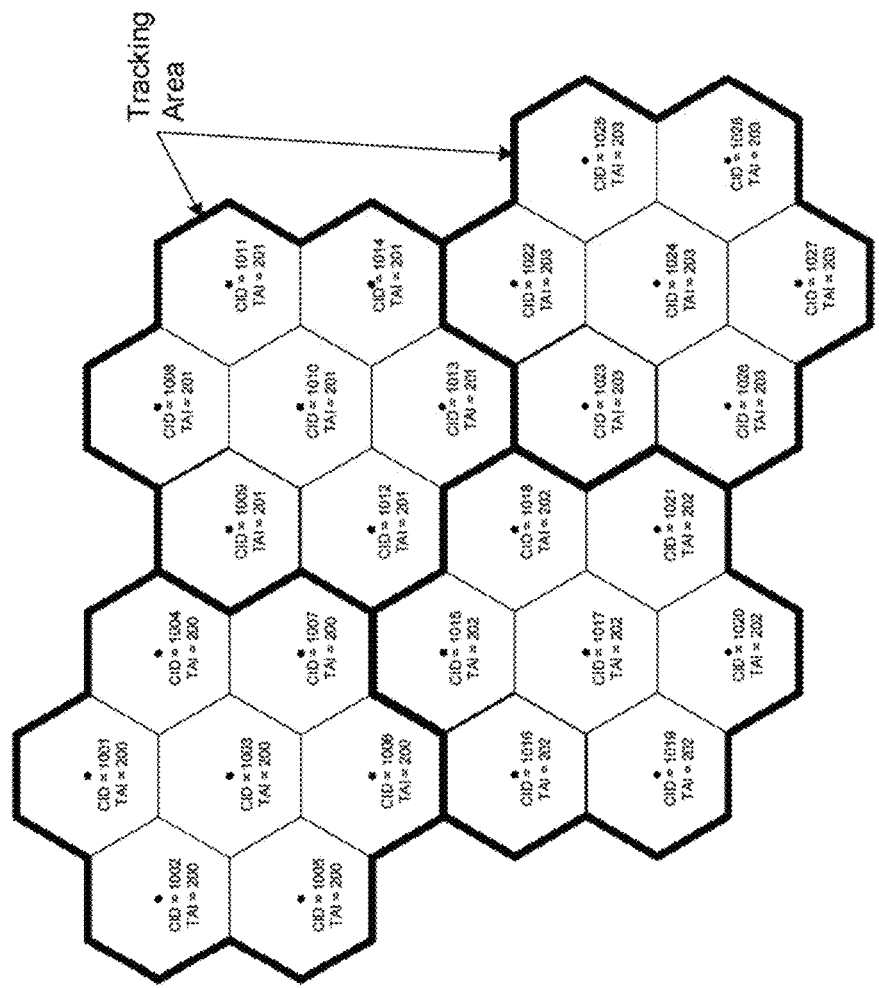
FIG. 2 illustrates the grouping of cells into tracking areas in a wireless communication system.
Figure 3:
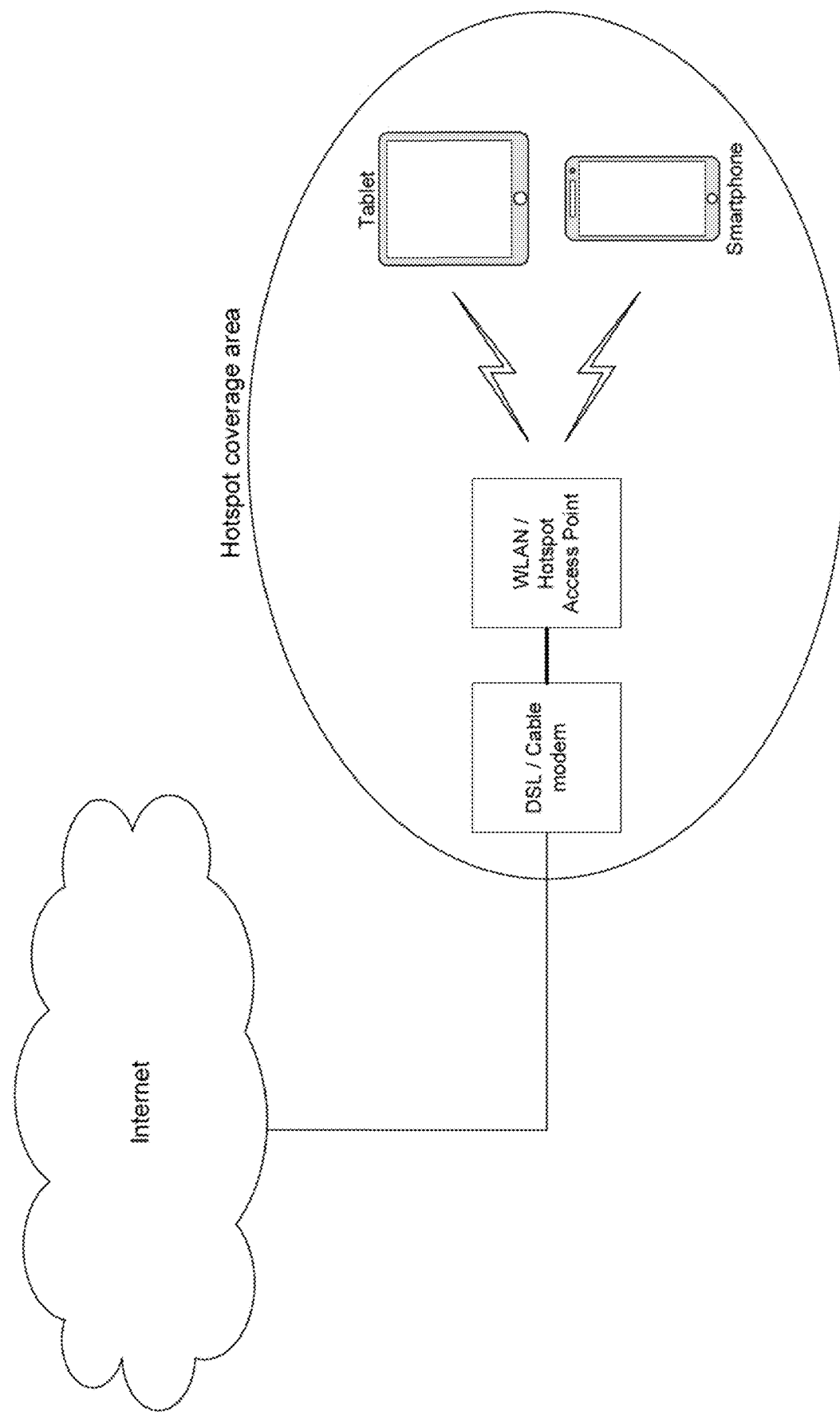
FIG. 3 illustrates an example scenario of internet access using Wireless Local Area Network (WLAN) over a traditional wire-line internet service.
Figure 4:
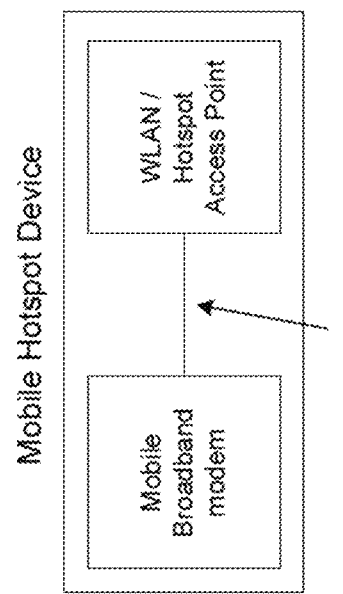
FIG. 4 illustrates a high-level block diagram of an example mobile Hotspot device.
Figure 5:
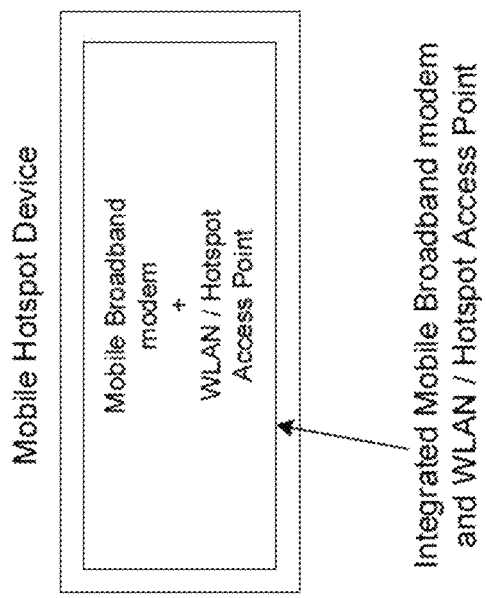
FIG. 5 illustrates a high-level block diagram of an example mobile Hotspot device with an integrated mobile broadband modem and WLAN Access Point (AP).
Figure 6:
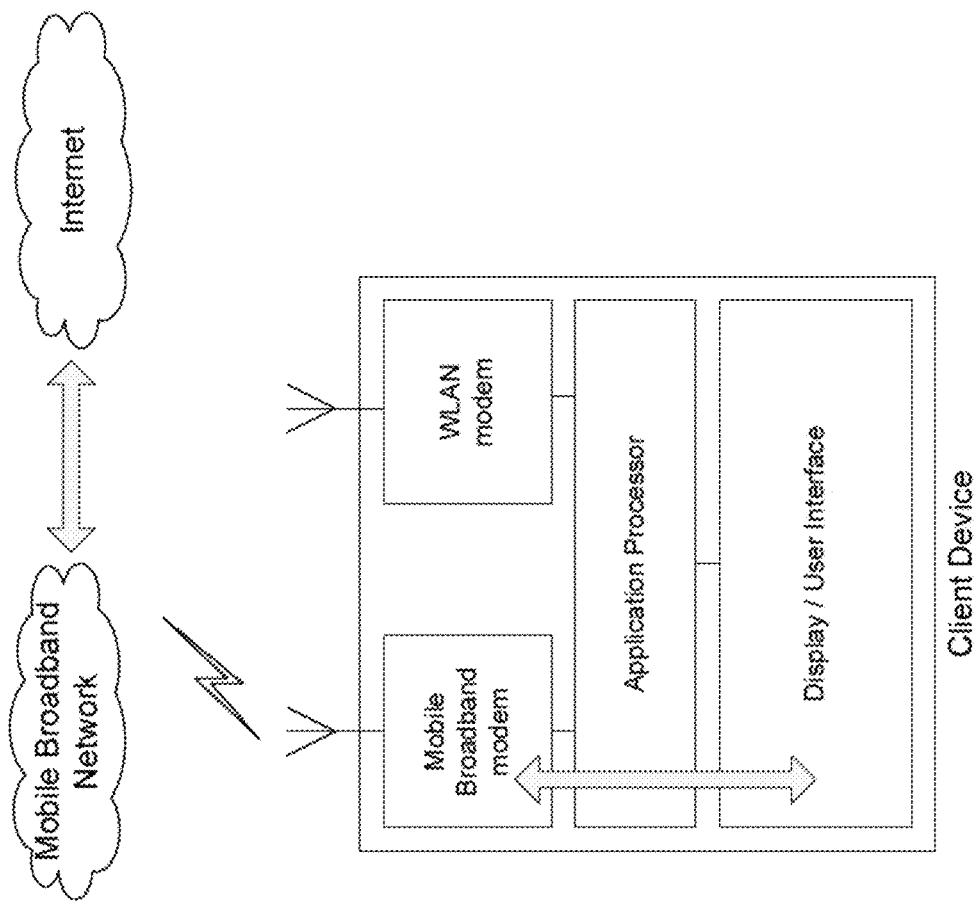
FIG. 6 illustrates a use case and data flow of internet access over a mobile broadband network by a client device.

The foregoing aspects, features and advantages of the present disclosure will be further appreciated when considered with reference to the following description of exemplary embodiments and accompanying drawings, wherein like reference numerals represent like elements. In describing the exemplary embodiments of the present disclosure illustrated in the appended drawings, specific terminology will be used for the sake of clarity. However, the present disclosure is not intended to be limited to the specific terms used.

Although aspects of the present disclosure are illustrated using a particular type of client devices and communication networks, the present disclosure is applicable to any type of client devices and communications networks some of which are mentioned in an earlier section in the present disclosure.

Figure 7:
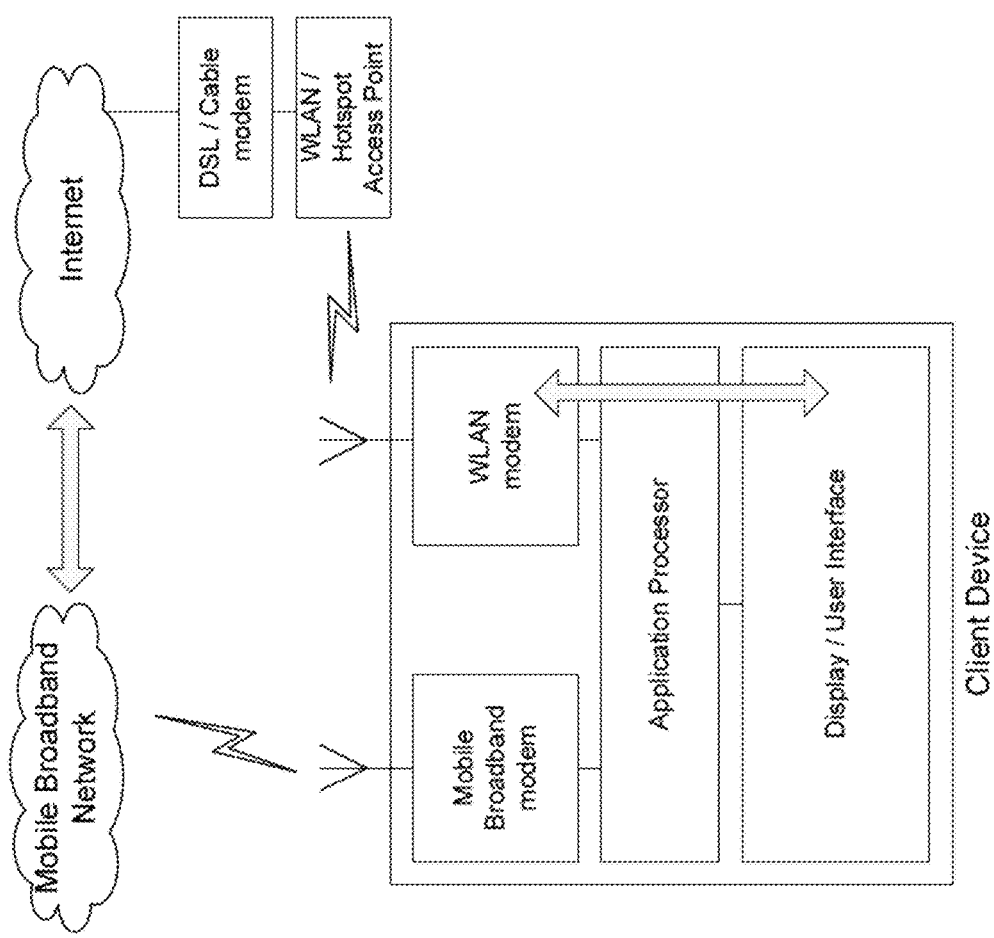
FIG. 7 illustrates a use case and data flow of internet access over a WLAN network by a client device.
Figure 8:
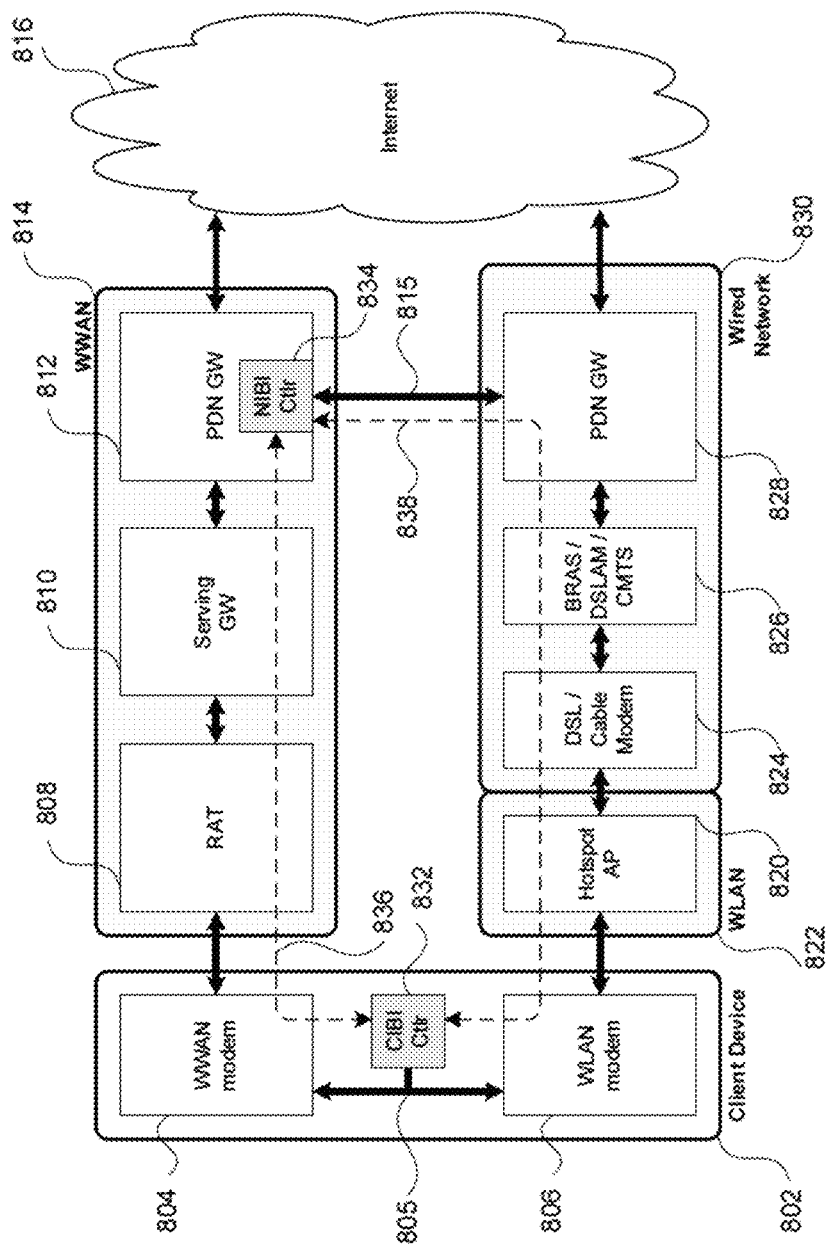
FIG. 8 illustrates the Internet Based Idle (IBI) mode data flow for the case of WLAN and wired network as alternate source of internet with direct interface between Wireless Wide Area Network (WWAN) Packet Data Network (PDN) Gateway (GW) and the wired network PDN GW according to the aspects of the present disclosure.

The example use case scenario illustrated in FIG. 7 is further elaborated in FIG. 8 where a client device may have internet service through WLAN and also internet plus other services through WWAN. The client device 802 may include a WWAN modem 804 and a WLAN modem 806 which interface with each other using the inter-modem interface 805. The inter-modem interface 805 may be implemented in software, hardware or a combination of the two. The WWAN 814 may include the PDN Gateway (GW) 812, the Serving GW 810 and the RAT 808 which may be 4G, 3G, 2G, a future generation technology, or some combination of RATs. The Wired Network 830 may include the PDN GW 828, the Digital Subscriber Line Access Multiplexer (DSLAM) or Broadband Remote Access Server (BRAS) or Cable Modem Termination System (CMTS) 826, and the DSL or Cable Modem 824. The WLAN 822 may include a Hotspot AP 820 which is connected to the DSL or Cable Modem 824. The PDN GW 812 of the WWAN 814 and the PDN GW 828 of the Wired Network 830 are connected to the internet 816. There may be a direct interface 815 between the two PDN GWs 812 and 828. The client device 802 is connected to the internet through the WWAN as well as the WLAN via the Wired Network.

According to an aspect of the present disclosure, a WWAN and a client device may establish the Internet Based Idle (IBI) mode of operation when the client device has internet service through an alternate source (other than the WWAN). A network that may provide the internet service as an alternate to the internet service from WWAN may be referred to as the alternate network. The terms alternate network and alternate source of internet service may be used interchangeable herein. The alternate network may be another WWAN that is different from a WWAN from which a client device nominally receives internet service. According to an aspect of the present disclosure, the client device may first communicate to the WWAN, through the RAT and serving GW, the information about its current internet connection with alternate source of internet. According to an aspect of the present disclosure, the client device may request the WWAN to enter IBI mode in order to perform the idle RRM procedures via the internet accessible to the client device through alternate source. According to the aspects of the present disclosure, the client device may provide the information about its CDI (IMSI, IP address, TCP or UDP port number, MAC address, etc.), the current serving cell ID, etc. to the WWAN when requesting the IBI mode of operation. According to the aspects of the present disclosure, the client device may provide the information, such as IP address of the PDN GW of its current alternate source of internet service. According to an aspect of the present disclosure, the PDN GW of the WWAN may communicate with the PDN GW, identified by the IP address provided by the client device, of the alternate source of internet service. According to an aspect of the present disclosure, the PDN GW of the WWAN may communicate with the PDN GW of the alternate network through a direct interface (may be wired or wireless) between the two PDN GWs. Use of the direct interface between the two PDN GWs may reduce the latency in communication between WWAN and the client device through the alternate network.

According to an aspect of the present disclosure, after the client device communicates the required information such as its CDI and the IP address of the PDN GW of the alternate network, the WWAN may determine whether to accept, modify or reject the IBI mode request. According to an aspect of the present disclosure, the WWAN may send the response to the IBI mode request from the client device over the WWAN. According to an aspect of the present disclosure, if the WWAN determines to accept or modify the IBI mode request from the client device, it may send the response to the IBI mode request through the alternate network. According to an aspect of the present disclosure, the client device may send a confirmation message for the WWAN IBI mode response through the alternate network. According to an aspect of the present disclosure, both the IBI mode response from the WWAN and the IBI mode confirmation from the client device may be sent over the WWAN. According to an aspect of the present disclosure, the IBI mode response from the WWAN and the IBI mode confirmation from the client device may be sent over both the WWAN and the alternate network to improve the reliability and performance. According to an aspect of the present disclosure, after the IBI mode confirmation is successfully sent by the client device and successfully received by the WWAN, the IBI mode establishment may be considered complete.

According to an aspect of the present disclosure, if there are any failures in sending or receiving one or more messages from the client device or the WWAN, the messages may be retransmitted for up to a configurable number of times, for example, three times. According to an aspect of the present disclosure, the retransmission of messages may be triggered by expiry of a timer which may be started when the message is transmitted. The timer duration may be configurable and tuned based on simulations and field testing. Its example value may be, for example, 10 seconds.

According to an aspect of the present disclosure, after having established IBI mode of operation, the client device may power off its WWAN modem. This may enable the client device to be reachable by the WWAN while reducing power consumption.

According to an aspect of the present disclosure, in IBI mode of operation, the WWAN may be able to initiate communication with the client device, for any reason, through the alternate network. According to an aspect of the present disclosure, in IBI mode of operation, the client device may be able to initiate communication with the WWAN, for any reason, through the alternate network.

When in a conventional idle mode, a client device may need to perform paging reception according to its PO and DRX cycle. According to an aspect of the present disclosure, in IBI mode of operation, a client device may receive the paging messages from the WWAN through the alternate network. According to an aspect of the present disclosure, the client device may tune its sleep/wake up cycle according to the requirements of the alternate network over which it may be receiving the internet service. For example, in a conventional idle mode such as when a client device is receiving paging messages directly from the WWAN, the DRX cycle of client device may be 2.56 seconds with a WWAN but it may use a higher or lower DRX cycle depending on the details of the particular alternate network through which it may be receiving the internet service.

According to an aspect of the present disclosure, when the client device receives a paging message through the alternate network and determines that the WWAN is attempting to communicate with it, the client device may power on its WWAN modem and have it synchronize with the WWAN. According to an aspect of the present disclosure, after synchronizing with the WWAN, the client device may perform the normal procedures for responding to a paging message according to the particular RAT being used by the WWAN. In a conventional idle mode operation, the WWAN may have to page a client device over an entire registration area since the WWAN may be aware of the location of the client device only based on its last registration area update. By paging a client device through the alternate network, the WWAN may avoid having to page a client device over an entire registration area. This in turn may reduce the unnecessary transmission of paging messages over precious channel resources. According to an aspect of the present disclosure, the client device may communicate to the WWAN the CID of its current serving cell. According to an aspect of the present disclosure, the WWAN may send the details about the dedicated uplink resources in which the client device may perform the procedures for paging response. According to an aspect of the present disclosure, the client device and the WWAN may pre-negotiate, during the IBI mode establishment, whether the client device may wait for dedicated resource allocation for paging response or the client device may initiate a conventional contention based random access procedure in the uplink for responding to paging. By informing the WWAN about the CID of the current serving cell of the client device through the alternate network, it may become feasible to perform paging response over dedicated uplink resources rather than contention based random access procedure which may be wasteful of channel resources as well as the transmit power of a client device. Furthermore, the dedicated uplink resources for paging response may reduce latency compared to the contention based paging response.

According to an aspect of the present disclosure, the processing for the IBI mode operation in a client device may be implemented by a Client IBI (CIBI) Controller in a client device. FIG. 8 illustrates the CIBI Controller 832. According to an aspect of the present disclosure, the CIBI Controller may interface with both the WWAN modem and the WLAN modem. The CIBI Controller 832 may use the hardware or software interface 805 between the two modems. The CIBI Controller may be implemented in hardware, software or combination of the two. Although WLAN is shown as an alternate source of internet service in FIG. 8, it is only an example and other sources of internet service such as Ethernet, Cable modem, fiber optic network, satellite, etc. are possible and may be supported by the present disclosure.

According to an aspect of the present disclosure, the processing for the IBI mode operation in a WWAN may be implemented by a Network IBI (NIBI) Controller which may be located inside a PDN GW of the WWAN. FIG. 8 illustrates the NIBI Controller 834. The NIBI Controller 834 may be implemented in hardware, software or combination of the two.

According to an aspect of the present disclosure, the NIBI Controller 834 and the CIBI Controller 832 may establish a logical connection through the Serving GW 810, RAT 808, and the WWAN modem 804 for the IBI mode of operation. According to an aspect of the present disclosure, the logical connection may be based on Internet Protocol (IP) data packets or other standardized or proprietary internet protocols. FIG. 8 illustrates this logical connection 836. According to an aspect of the present disclosure, the NIBI Controller 834 and the CIBI Controller 832 may establish a logical connection through the Wired Network PDN GW 828, BRAS/DSLAM/CMTS 826, DSL/Cable Modem 824, Hotspot AP 820, and the WLAN modem 806. According to an aspect of the present disclosure, the logical connection may be based on Internet Protocol (IP) data packets or other standardized or proprietary internet protocols. FIG. 8 illustrates the logical connection 838. According to an aspect of the present disclosure, all the message exchanges between the CIBI Controller in the client device and the NIBI Controller in the WWAN take place over the two logical interfaces described above. Prior to the establishment of the IBI mode of operation, the communication between the CIBI Controller and NIBI Controller may be over the path 836. After the establishment of the IBI mode of operation, the communication between the CIBI Controller and NIBI Controller may be over the path 838.

Figure 9:
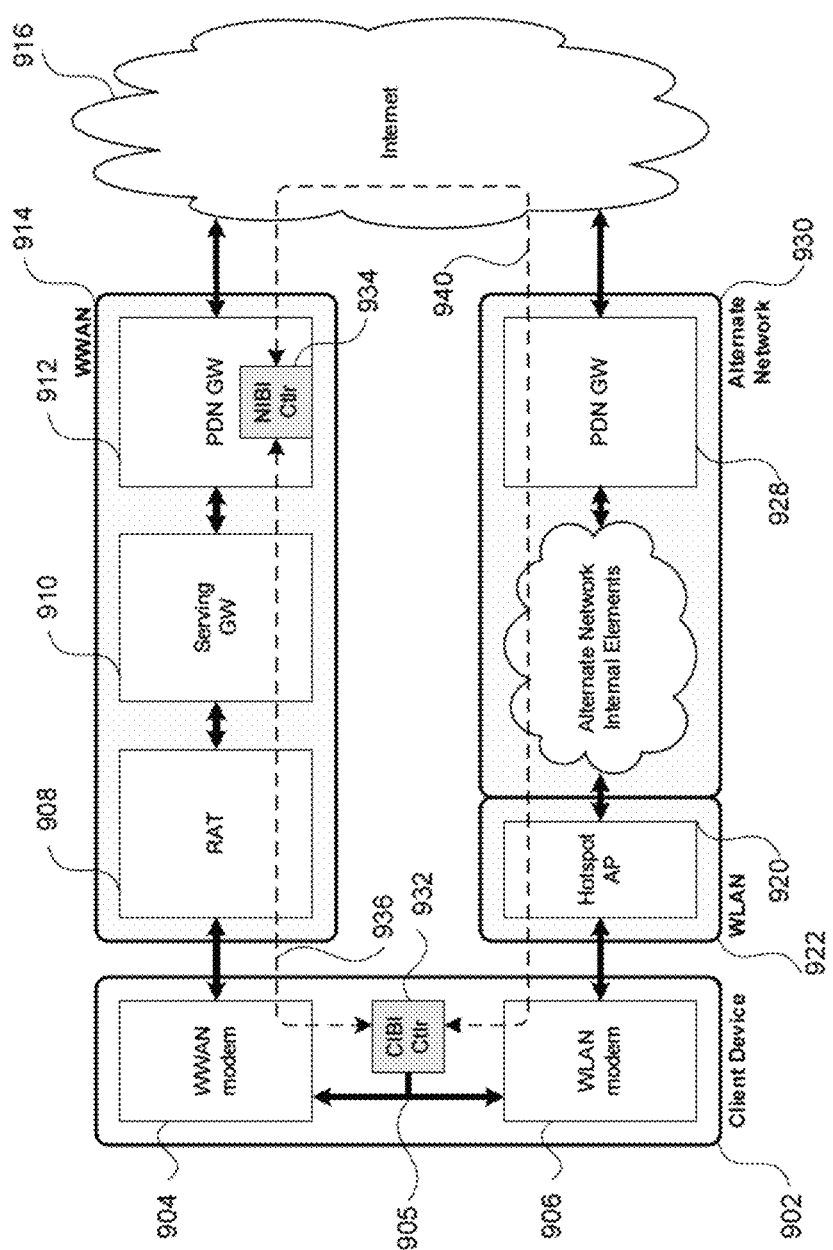
FIG. 9 illustrates the IBI mode data flow for the case of WLAN and unspecified alternate source of internet without direct interface between WWAN PDN GW and the alternate source of internet according to the aspects of the present disclosure.
Figure 10:
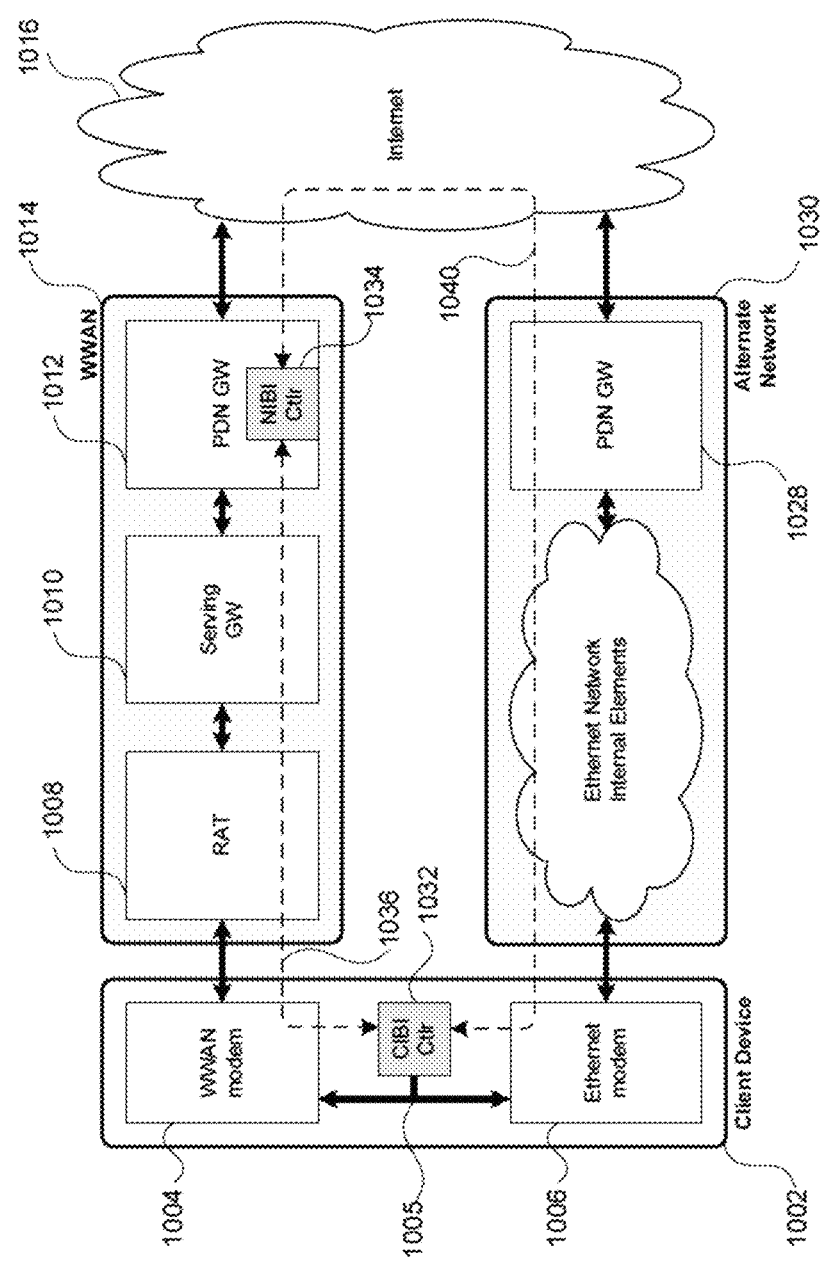
FIG. 10 illustrates the IBI mode data flow for the case of Ethernet as the alternate source of internet without direct interface between WWAN PDN GW and the Ethernet according to the aspects of the present disclosure.

In some cases, it may not be possible to have a direct interface between the PDN GWs of the WWAN and the alternate network, such as the interface 815 shown in FIG. 8. Therefore, it may not be feasible to have the logical connection 838 between the NIBI Controller and the CIBI Controller. According to an aspect of the present disclosure, the PDN GW of the WWAN may communicate with the PDN GW of the alternate network and eventually with the CIBI Controller and the client device indirectly through the internet. This method for IBI mode operation is illustrated in FIG. 9 in which the logical connection 940 between the NIBI Controller and the CIBI Controller is established through the internet via the alternate network. According to an aspect of the present disclosure, in the IBI mode of operation through the internet, the client device need not know the IP address of the PDN GW of the alternate network and it need not communicate the IP address of the PDN GW of the alternate network to the NIBI Controller. According to an aspect of the present disclosure, the NIBI Controller may use the IP address of the client device to communicate with it over internet via the alternate network. All the message exchanges for establishing the IBI mode of operation and other related procedures described above, for the case where the PDN GW of the WWAN and the PDN GW of the alternate network have direct interface, may be applicable to the present scenario where there may not be such a direct link between the two PDN GWs. As illustrated in FIG. 9, the internal details of the alternate network are not relevant to the IBI mode of operation through the internet except that the PDN GW of the alternate network needs to be connected to the internet. The alternate network could be a wired network, a wireless network, an optical fiber network, a satellite network, etc. As an example, FIG. 10 illustrates a client device 1002 includes a WWAN modem 1004 and Ethernet modem 1006 and it is connected to the WWAN 1014 and to the alternate network 1030 comprising Ethernet.

Since a client device can be mobile, it may be important to periodically reestablish the CID of the cell from which the client device that is in IBI mode may receive service from if it were to initiate active communication with a WWAN. According to an aspect of the present disclosure, when a client device is in IBI mode of operation and has powered off its WWAN modem, it may periodically power on its WWAN modem to synchronize with the WWAN and determine the CID, TAI and Location Area Code (LAC) of the camped-on cell. The periodic time duration for reestablishing the CID of the camped-on cell may be configurable, for example, once every 30 minutes. According to another aspect of the present disclosure, if the CID of the cell to which the client device synchronizes is the same as that of the camped-on cell when it entered the IBI mode of operation, the client device may power off the WWAN modem and remain in IBI mode of operation without taking any other additional action. According to another aspect of the present disclosure, if the CID of the cell to which the client device synchronizes is different from the CID of the cell to which the client device was synchronized when it entered the IBI mode of operation, the client device may power off the WWAN modem, remain in IBI mode of operation, and initiate TAU procedure or registration area update procedure or both depending on the TAI and LAC of the new cell compared to that of the cell to which the client device was synchronized when it entered the IBI mode of operation.

According to an aspect of the present disclosure, the WWAN and the client device may establish the Serving WWAN Internet Based Idle (SWIBI) mode of operation when the client device has internet service through WWAN. According to an aspect of the present disclosure, in SWIBI mode, the client device may only decode the dedicated unicast channels from the WWAN and may neither decode the broadcast channel for SI messages nor multicast channel for paging messages from the WWAN. According to an aspects of the present disclosure, the client devices that are in connected mode with the WWAN may get the SI and paging message updates for the serving cell and/or SI message updates for neighbor cells from the WWAN over the internet service from the alternate network. This may enable a client device to avoid decoding SI and paging message channels for the serving cell and neighbor cells. The SWIBI mode is also applicable for the client devices with multi-RAT capability. According to an aspect of the present disclosure, when a client device is in connected mode with one RAT of a WWAN, the client device may get into the SWIBI mode when in connected mode with one RAT of the WWAN to receive the SI and paging messages for the other RATs of the same WWAN through the internet service from the alternate network. This may enable a client device to avoid synchronization to and decoding of the SI and paging messages of the other RATs The IBI mode of operation may be completely agnostic about the particular alternate network through which the client device may be obtaining internet service. Furthermore, the IBI mode of operation may be enabled without the client device providing its IP address to the WWAN. This may be desirable since the client device may frequently change its IP address. For example, a user may obtain Internet service from many different alternate networks such as different WLAN networks at home, hotel, coffee shop, etc. as well as different Ethernet networks or different IP addresses in different parts of an office. Furthermore, some of the IBI mode related messaging may be initiated from a client device rather than from the WWAN. In such cases the IBI mode of operation that may be agnostic about the particular alternate network may be preferred.

According to an aspect of the present disclosure, in another embodiment of the IBI mode, referred herein as asynchronous IBI mode, a WWAN may add a web server to its network which may include, for each cell identified by its CID, a unique link ID (LID). According to an aspect of the present disclosure, each cell in the WWAN may be assigned a unique IP address and Transmission Control Protocol (TCP) or User Datagram Protocol (UDP) port combination which is referred herein as the LID. According to an aspect of the present disclosure the WWAN may assign one IP address for the WWAN web server (WWS) which may be common for all the cells in the WWAN and may uniquely identify a cell with other parameter combination such as PLMN, Frequency, CID, TAI, etc. In this case the LID may include the common IP address for the WWS and other associated parameters which uniquely identify a CID record in the WWS. According an aspect of the present disclosure, each cell in a WWAN may broadcast its LID in its SI messages. According to an aspect of the present disclosure, the WWAN may also broadcast Hypertext Transfer Protocol (HTTP) connection details for the WWS for the client device to connect to it. According to an aspect of the present disclosure, the HTTP connection details of the WWS may be known a priori to the client devices. For example, the HTTP connection details may be provided during the provisioning of the client device. According to an aspect of the present disclosure, the communication between the client device and the WWS may be secured communication and the security credentials may be obtained by the client devices based on the normal security procedure it follows when communicating with the WWAN. Alternatively, according to an aspect of the present disclosure, the client device and the WWS may use other standardized protocols at application levels such as HTTP Secure (HTTPS).

According to an aspect of the present disclosure, the client device may send IBI mode request to the WWAN indicating a preference for the asynchronous IBI mode and may include the LID of the cell with which it may be registered. The WWAN may accept the asynchronous IBI mode request; may modify the request to the normal IBI mode operation request; or may reject the IBI mode request. Based on the IBI mode response from the WWAN, the client device may confirm the IBI mode operation as per the response from the WWAN. All the message exchanges for establishing the asynchronous IBI mode operation may be performed through the internet as for the case when there is no direct interface between the PDN GW of the WWAN and the PDN GW of the alternate network.

After establishing the asynchronous IBI mode of operation, according to an aspect of the present disclosure, a client device may communicate with the WWAN and the cell, on which it was previously camped before entering the asynchronous IBI mode, by connecting to the WWS using a TCP or UDP socket with the LID of the cell identified by its CID. This connection is herein referred to as IBI Mode WWAN Connection (IBIMWC). According to an aspect of the present disclosure, the WWAN may define a file structure, referred to herein as WWAN IBI mode file structure, according to which the WWAN may store additional information about each cell. According to an aspect of the present disclosure, the file structure may follow a standard eXtensible Mark-up Language (XML) format or other similar such format. According to an aspect of the present disclosure, the WWAN may store in the file, according to WWAN IBI mode file structure, in addition to the CID and LID for each cell, other identifiers for the cell such as PLMN ID, channel number, etc. which may further uniquely identify the cell in the WWAN and across other WWANs. The client devices may use this information to confirm the cell identifiers when they connect with the cell in the IBI mode through the alternate network. The file containing the information about the cell and the client device as per the WWAN IBI mode file structure is referred herein as the WWAN IBI mode file. According to an aspect of the present disclosure, the WWAN may store the WWAN IBI mode file on the WWS which may be accessible to the registered client devices. According to as aspect of the present disclosure, before entering the asynchronous IBI mode, when a client device registers with a WWAN, a record of the client device may be added in the WWAN IBI mode file corresponding to the cell on which the client device may be camped. According to an aspect of the present disclosure, when the client device establishes the IBIMWC with the WWS, the client device may query the WWS with LID to identify the WWAN IBI mode file corresponding to the CID of the cell on which it may be camped. According to an aspect of the present disclosure, the WWS may respond with the WWAN IBI mode file handle with which the client device may perform file operations such as open, read, write, and close on the WWAN IBI mode file corresponding to the CID. According to aspect of the present disclosure, the cell may broadcast the file handle of its WWAN IBI mode file as part of the LID fields in the SI message, in which case, the client device may directly use the file handle to perform the operations on the WWAN IBI mode file corresponding to the CID of the cell on which it may be camped. An example of WWAN IBI mode file in XML format is shown in FIG. 20. In this example, the WWAN IBI mode file in XML format shows information about one particular cell of a particular PLMN along with two client devices camped on that cell. The information about the cell may include the TAI, SIB1, and SIB2. The information about the client devices may include MAC address, IP address and IMSI. This WWAN IBI mode file in XML format may be further extended by inclusion of information about additional cells and client devices in a similar manner as shown for one cell and two client devices.

Figure 11:
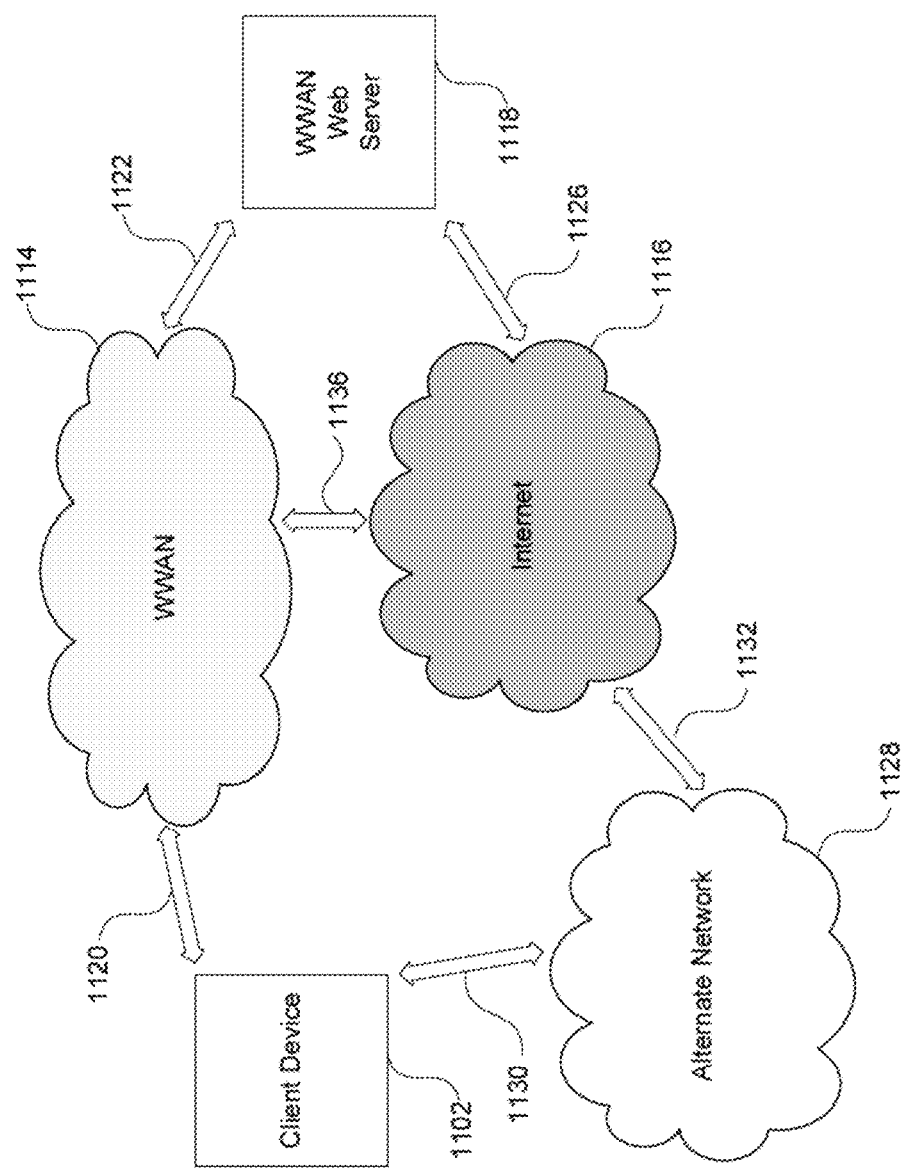
FIG. 11 illustrates the asynchronous IBI mode use case with WWAN web server (WWS) and the alternate source of internet according to the aspects of the present disclosure.

The asynchronous IBI mode operation with WWS is illustrated in FIG. 11. The client device 1102 may be connected to the WWAN 1114 through the interface 1120 and may be connected to the alternate network 1128 through the interface 1130. Both the WWAN and the alternate network may be connected to the internet 1116 through interfaces 1136 and 1132 respectively. Both the WWAN 1114 and the internet 1116 are connected to the WWS 1118 through the interfaces 1122 and 1126 respectively. Before entering the asynchronous IBI mode of operation, the client device 1102 may communicate with the WWAN 1114 only through the interface 1120. After establishing the asynchronous IBI mode of operation, according to an aspect of the present disclosure, the WWAN may make the required updates to the particular records in the WWAN IBI mode file in the WWS. The WWAN may make the updates sporadically and/or periodically. After establishing the asynchronous IBI mode of operation, the client device may periodically read, from the WWAN IBI mode file in the WWS, the particular record corresponding to its own CID and the LID of the cell on which it was last camped when it entered the asynchronous IBI mode. The client device may access the WWS using the alternate network 1128 via the interface 1130 which connects to the internet 1116 which in turn connects to the WWS 1118. The client device may no longer communicate with the WWAN through the interface 1120.

According to an aspect of the present disclosure, a WWAN may update or create a relevant record in the WWAN IBI mode file on the WWS, depending on the expected operation from intended client device. According to an aspect of the present disclosure, when a client device reads the relevant record in the WWAN IBI mode file on the WWS, depending on the content of the record, it may take appropriate actions as described for the case of normal IBI mode operation.

According to an aspect of the present disclosure, if the record in the WWAN IBI mode file on the WWS indicates that the WWAN is paging the client device, it may first power on the WWAN modem, synchronize to a suitable cell of the WWAN, and then begin the process of responding to the paging message as per the normal procedures of the particular RAT being used by the WWAN. According to an aspect of the present disclosure, the relevant record in the WWAN IBI mode file on the WWS may include additional information such as dedicated uplink resources for responding to the paging.

According to an aspect of the present disclosure, the WWAN may provide different PO and DRX cycle details to the client devices when they are in asynchronous IBI mode compared to conventional idle mode operation or normal IBI mode operation. According to an aspect of the present disclosure, the PO and DRX details may be part of the fields of the WWAN IBI mode file structure for the cell. According to an aspect of the present disclosure, when a client device enters the asynchronous IBI mode, it may read the PO and DRX details required to monitor the paging messages on the WWS through the alternate source internet service. According to an aspect of the present disclosure, depending on the PO and the DRX cycle, the client device may setup periodic socket connection with the WWS using the LID to read the client device record in the WWAN IBI mode file to monitor the page record update from the WWAN.

According to an aspect of the present disclosure, when the client device moves out of the coverage area of the alternate network or when the client device decides to disconnect from the alternate network, the client device may follow the conventional cell camp-on and registration process with the WWAN. According to an aspect of the present disclosure, the client device and the WWAN may implicitly exit IBI mode of operation when it registers back directly with the WWAN. According to an aspect of the present disclosure, in another embodiment, a client device may communicate with the WWAN through the alternate internet source about its planned exit from the IBI mode and may avoid performing registration directly with the WWAN immediately after exiting the IBI mode. According to an aspect of the present disclosure, before the client device notifies the WWAN through the alternate internet source that it plans to exit the IBI mode, it may perform cell camp-on and may communicate, through alternate internet source, to the WWAN about the CID of the cell on which it is camped. According to an aspect of the present disclosure, when the client device notifies about its recent camped on cell's CID to the WWAN through the alternate internet source, the WWAN may send a paging message through the RAT of the WWAN to the client device to register and may accept or reject the client device's registration request to camp on with the particular cell in the WWAN.

According to an aspect the present disclosure, the client device may change the alternate internet source any number of times while in normal or asynchronous IBI mode and may or may not communicate to the WWAN about the change in the alternate internet source.

According to an aspect of the present disclosure, if the client device is registered with more than one WWAN or multiple RATs of the same WWAN, the client device may notify all or some RATs (regardless of whether from the same or different WWAN) when it enters the normal or asynchronous IBI mode. According to an aspect of the present disclosure, when the client device is registered with more than one RAT, it may monitor the paging message from all the RATs to which it may be registered and has entered into IBI mode. It is a common scenario that when a client device is registered with more than one RAT, the PO and the DRX cycle may be different for different RATs. According to an aspect of the present disclosure, the client device may establish dedicated socket connection with the WWS for particular cells of each RAT in which it may be registered. According to an aspect of the present disclosure, the WWS may be located separately from the other elements of the WWAN, as illustrated in FIG. 11. According to an aspect of the present disclosure, the WWAN may have multiple instances of WWS distributed throughout its geographic area of coverage. According to an aspect of the present disclosure, the multiple instances of the WWS may be operated as a cloud server which may be available from some of the commercial cloud server providers. According to an aspect of the present disclosure, the WWAN IBI mode file in each instance of the WWS may be identical, covering all the cells and client devices in asynchronous IBI mode in the entire WWAN. According to an aspect of the present disclosure, the WWAN IBI mode file in each instance of the WWS may be partly overlapping and common with one or more other instances of the WWS. For example, overlap may be present for WWSs for geographically adjacent areas. According to an aspect of the present disclosure, the WWAN IBI mode file in each instance of the WWS may be unique and may be specific to the geographic area it serves.

According to an aspect of the present disclosure, the client device in IBI mode may receive the SIs of the last serving cell, on which it was last camped before entering IBI mode, through the alternate source of internet. According to an aspect of the present disclosure, in the normal IBI mode of operation, the WWAN may send the SIs to the client device over internet service through the alternate source whenever there is an update in SIs. According to an aspect of the present disclosure, in the asynchronous IBI mode of operation, the client device may periodically check the contents of the WWAN IBI mode file to determine whether there is any new SIs to be downloaded through the internet via the alternate network. According to aspect of the present disclosure, the client device may determine whether the SI is updated or not based on the change mark of the SI messages and the paging messages. According to an aspect of the present disclosure, SIs may be uniquely identified in the WWAN IBI mode file with the combination of PLMN ID, channel number, CID, physical layer cell ID, change mark, and optionally location (latitude and longitude of the cell).

The client devices may also need to decode and keep updated the SIs of the neighbor cells. According to an aspect of the present disclosure, a client device may communicate with the WWAN, during the IBI mode establishment, its preference for receiving SIs of neighbor cells. For example, a client device may indicate that it prefers to receive SIs for cells that may be immediately adjacent to its current serving cell. In another example, a client device may indicate that it prefers to receive SIs for cells that may be within a certain distance of its current serving cell. In yet another example, a client device may indicate that it prefers to receive SIs for cells that are listed as neighbor cells in the current serving cell's SI. According to an aspect of the present disclosure, in case of normal IBI mode, the WWAN may group all the neighbor cells whose SIs may have changed and from the version of SIs the client device is known to have received previously, and send the SIs for the set of neighbor base stations over internet service from the alternate source. According to an aspect of the present disclosure, in case of asynchronous IBI mode, the WWAN may group all the neighbor cells whose SIs may have changed and from the version of SIs the client device is known to have received previously, and update the corresponding field in the WWAN IBI mode file in the WWS.

According to an aspect of the present disclosure, the client device may periodically check the WWS for any updated SI in the WWAN IBI mode file. For example, it may check for updated SI whenever it reads the WWAN IBI mode file from the WWS for paging messages. According to an aspect of the present disclosure, WWS may send a broadcast or multicast message containing the new SIs to the client devices that were camped on a particular cell and are now in asynchronous IBI mode with the WWAN. According to an aspect of the present disclosure, the client devices may register with the WWS to get a notification from the WWS whenever the SIs of a specified group of cells may be updated. The availability of latest SI of serving and neighbor cells may expedite the cell acquisition and registration with the WWAN when the client device needs to get service from it.

According to an aspect of the present disclosure, the WWAN may broadcast the neighbor cell LIDs as part of neighbor cells record in the serving cell SI messages. According to an aspect of the present disclosure, when a client device enters the IBI mode of operation, it may use the LID corresponding to each neighbor cell to access the neighbor cell WWAN IBI mode file to get the SI update for neighbor cells from the WWS. Accordingly to an aspect of the present disclosure, the client device may follow the same DRX cycle periodicity as that of the serving cell or may follow different DRX cycle periodicity to access the WWS for the updates in neighbor cell IBI mode file.

According to an aspect of the present disclosure, the WWAN may store the location details of each cell in the IBI mode file for the cell identified by its CID. According to an aspect of the present disclosure, the client device may use its current location details in a query to the WWS to return the identifiers for the IBI mode files for cells which may be located within certain radius of the current location of the client device. This may enable the client device to keep its SI updated for neighbor cells that are close to the client device even when it is in mobile.

Similar to the WWAN IBI mode file, it may be possible to create and maintain a Client Device (CD) IBI mode file on a web server which may be used to store and maintain information updated by multiple client devices. According to an aspect of the present disclosure, the web server which stores the CD IBI mode file need not be part of the WWAN. The CD IBI mode file may be stored on a general purpose web server and may belong to general internet cloud which is referred herein as General Web Server (GWS). According to an aspect of the present disclosure, the IP address of the GWS and application level (e.g., HTTP) port details of the GWS may be pre-provisioned in a client device. According to an aspect of the present disclosure, the IP address and other access details of the GWS may be entered by the user manually in the client device. There may be no communication needed between a client device and the WWAN for establishing the GWS and there may be no need to enter any mode or registration with the WWAN to access the GWS.

Similar to the WWAN IBI mode file, the CD IBI mode file may use the XML format or other similar such format for flexibility and extensibility. According to an aspect of the present disclosure, one or more client devices may upload to the CD IBI mode file the SIs decoded by the client devices directly from the WWAN through the RAT. According to an aspect of the present disclosure, the decoded SIs may include the SIs from the serving cell as well as the neighbor cells. According to an aspect of the present disclosure, the client devices may update the SIs in the CD IBI mode file when there is a change in the SIs as indicated by the change mark (in paging message or in the SIs themselves). According to an aspect of the present disclosure, the SIs may be uniquely identified in the CD IBI mode file with the combination of PLMN ID, channel number, CID, physical layer cell ID, change mark, and optionally location (latitude and longitude of the cell). Note that the client devices decoding the SIs directly from the WWAN through the RAT may not have entered the IBI mode of operation. However, some other client devices may have entered the normal or asynchronous IBI mode of operation. According to an aspect of the present disclosure, a client device that has entered the asynchronous IBI mode of operation, may receive the latest SIs of its last serving cell before entering asynchronous IBI mode as wells as SIs of its neighbor cells from the CD IBI mode file on the GWS. Note that the SIs in the CD IBI mode file may be updated by other client devices and not necessarily by the WWAN. Receiving the updated SIs from the CD IBI mode file on the GWS may enable a client device to power off the WWAN modem for SI acquisition and update purposes.

According to an aspect of the present disclosure, a client device in asynchronous IBI mode may prefer to receive SIs for neighbor cells that are immediately adjacent to its current serving cell. According to an aspect of the present disclosure, a client device may prefer to receive SIs for cells that are within a certain distance of its current serving cell. According to an aspect of the present disclosure, the client device may periodically check the GWS for any updated SI in the CD IBI mode file. For example, it may check for updated SI in the CD IBI mode file whenever it reads the WWAN IBI mode file from the WWS for paging messages. According to an aspect of the present disclosure, GWS may send broadcast or multicast messages containing the new SIs to the client devices that were camped on a particular cell and are now in asynchronous IBI mode with the WWAN. According to an aspect of the present disclosure, the client devices may register with the GWS to get a notification from the GWS whenever the SIs of a specified group of cells is updated. The availability of latest SI of serving cell and neighbor cells may expedite the cell acquisition and registration with the WWAN when the client device may need to get service from it.

Since the CD IBI mode file is generated collaboratively, according to an aspect of the present disclosure, its integrity may be partly verified by the client device by directly decoding the SIs from the RAT of the WWAN.

According to an aspect of the present disclosure, each client device in asynchronous IBI mode of operation may store its location details in the CD IBI mode file along with the SIs. According to an aspect of the present disclosure, a client device may use its current location details in a query to the GWS to provide the CD IBI mode file identifiers which may correspond to the cells which may be located within certain radius of the current location of the client device. This may enable a client device to keep its SI updated for nearby neighbor cells even when a client device is mobile.

According to an aspect of the present disclosure, when a client device updates the SI for a particular cell, it may store the global time stamp, e.g., Greenwich Mean Time (GMT) in the CD IBI mode file. According to an aspect of the present disclosure, another client device may query the GWS to return the CD IBI mode file identifier which has the most recent updated SI information for a particular cell. According to an aspect of the present disclosure, the GWS may use the GMT stored in the CD IBI mode file to determine the most recent available updates for a given cell in its database. It is to be understood that there will be a separate CD IBI mode file maintained by each client device. There may be different CD IBI mode file corresponding to different client devices which may carry the information about the same cell.

For the purpose of maintaining continuity across the time instant when a change of SI occurs, the CD IBI mode file may maintain up two versions of the SIs; one version may be the latest and another may be the version prior to the latest.

Figure 12:
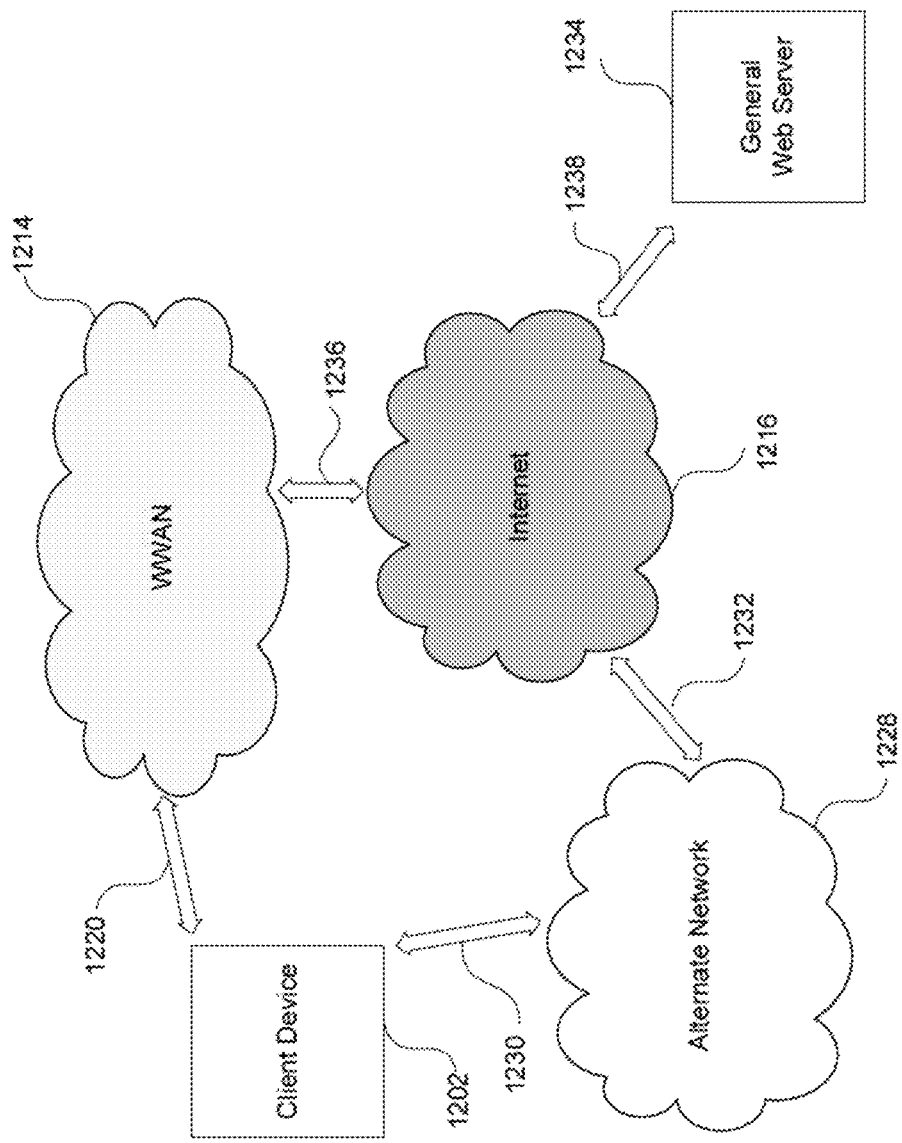
FIG. 12 illustrates the asynchronous IBI mode use case with General Web Server (GWS) and the alternate source of internet according to the aspects of the present disclosure.

The asynchronous IBI mode operation with GWS is illustrated in FIG. 12. The client device 1202 may be connected to the WWAN 1214 through the interface 1220 and may be connected to the alternate network 1228 through the interface 1230. Both the WWAN and the alternate network may be connected to the internet 1216 through interfaces 1236 and 1232 respectively. The internet 1216 is connected to the GWS 1234 through the interface 1238. Before entering the asynchronous IBI mode of operation with GWS, the client device 1202 may communicate with the WWAN 1214 only through the interface 1220. After establishing the Asynchronous IBI mode of operation with GWS, the client device may periodically read, from the CD IBI mode file in the GWS, the particular record corresponding to its own CID and the LID of the cell on which it was last camped when it entered the Asynchronous IBI mode. The client device may access the GWS using the alternate network 1228 via the interface 1230 which connects to the internet 1216 which in turn connects to the GWS 1234. The client device may no longer communicate with the WWAN through the interface 1220 when in asynchronous IBI mode operation with GWS.

Similar to the CD IBI mode file for maintaining the SIs of various cells decoded and uploaded by one or more client devices, it may be possible to update the WWAN IBI mode file with the SIs of various cells decoded by one or more client devices. According to an aspect of the present disclosure, the WWAN operator may allow access to some or all client devices to update the WWAN IBI mode file with the SIs decoded by the client device. According to an aspect of the present disclosure, the WWAN operator may allow access to some or all client devices to access the WWAN IBI mode file with the SIs decoded by other client devices. The access to the WWAN IBI mode file may be similar to the case in which the SIs in the WWAN IBI mode file is updated by the WWAN directly.

Similar to the CD IBI mode file for maintaining the SIs of various cells decoded and uploaded by one or more client devices, it may be possible to store and maintain measurements performed by client devices on the cells visible to each of the respective client devices. As in the case of SI messages, the measurements information for each cell from one or more client devices may be stored in XML or other similar format for flexibility and extensibility. According to an aspect of the present disclosure, one or more client devices may upload to the CD IBI mode file with the measurements performed by the client devices directly on the cells of a particular RAT on which they may be camped. According to an aspect of the present disclosure, the measurements may be performed on the serving cell as well as on the neighbor cells of each client device. According to an aspect of the present disclosure, the client devices may update the measurements in the CD IBI mode file periodically regardless of whether the measured values, such as RSSI, RSRP, RSRQ, etc. have changed or not. According to an aspect of the present disclosure, the client devices may update the measurements in the CD IBI mode file whenever the measured values, such as RSSI, RSRP, RSRQ, etc. meet certain reporting or update criteria. The reporting criteria may include, for example, a change in value by certain amount, e.g., 3 dB change in RSSI.

According to an aspect of the present disclosure, the measurements may be uniquely identified in the CD IBI mode file with the combination of PLMN ID, channel number, CID, physical layer cell ID, and location (latitude and longitude of the cell). Note that the client devices performing the measurements on the cells of a RAT may not necessarily have entered the IBI mode of operation. However, some other client devices may have entered the normal or Asynchronous IBI mode of operation. According to an aspect of the present disclosure, a client device that has entered the Asynchronous IBI mode of operation, may receive the measurements on its last serving cell before entering asynchronous IBI mode as wells as measurements on its neighbor cells from the CD IBI mode file on the GWS. Note that the measurements in the CD IBI mode file may be updated by other client devices (possibly not involved in IBI mode). The measurements in the CD IBI mode file may not be updated by the WWAN. Receiving the latest measurements from the CD IBI mode file on the GWS may enable a client device to not turn on the WWAN modem for measurements purposes.

According to an aspect of the present disclosure, a client device in asynchronous IBI mode may prefer to receive measurements for cells that are immediately adjacent to its most recent serving cell. According to an aspect of the present disclosure, a client device may prefer to receive measurements for cells that are within a certain distance of its most recent serving cell. According to an aspect of the present disclosure, the client device may periodically check the GWS for any updated measurements in the CD IBI mode file. For example, it may check for updated SI in the CD IBI mode file whenever it reads the WWAN IBI mode file from the GWS for paging messages. A measurement report may contain one or more measurements for one or more cells. According to an aspect of the present disclosure, the GWS may send broadcast or multicast messages containing the new measurement reports for cells to the client devices that were camped on a particular cell and are now in asynchronous IBI mode with the WWAN. According to an aspect of the present disclosure, the client devices may register with the GWS to get a notification from the GWS whenever the measurements for at least one of the cells in a specified group of cells are updated and have changed as per the configured criteria. The availability of latest measurements from multiple other client devices may expedite the cell reselection with the WWAN when the client device needs to get service from it.

Note that in case of SI for each cell in the CD IBI mode file, there may be a single set of SIs per cell. However, for the case of measurements, there may be multiple measurements reports from multiple client devices for the same cell. Some of the measurements for the same cell may be from client devices that may be in close proximity to each other or may be from client devices that may be separated by considerable distance. According to an aspect of the present disclosure, the location information associated with each of the measurements reported by each client devices may be used for more targeted purposes. According to an aspect of the present disclosure, the client devices that register with the GWS for receiving measurement report may provide its own location information to the GWS. According to an aspect of the present disclosure, the GWS may be configured to broadcast or multicast the updated measurement report to the client devices that may have registered to receive the updated measurements only if the measurements were from locations within a very short distance, e.g., 100 meters, from its last known location. The distance criteria for sending the measurements to the client devices may be configurable and the values may be obtained through simulations and field testing.

Since the location of a client device within a cell may vary by any amount, small and large, the number of different measurements to be maintained for each cell for each location may be excessive. According to an aspect of the present disclosure, the GWS may combine, such as average, measurements from different client devices for a given cell for certain locations that are within a small radius of each other. For example, the measurements reported by client devices that are within, e.g., 10 meters, of each other may be combined. According to an aspect of the present disclosure, the GWS discard measurements that may be considered to be outliers. An outlier may be determined by using conventional statistical techniques such as how different a value is from the average. According to an aspect of the present disclosure, there may be a configurable number of measurements data related entries in the CD IBI mode file on the GWS. According to an aspect of the present disclosure, a client device reading the measurements information from the CD IBI mode file may use measurements from the location closest to its own location. According to an aspect of the present disclosure, the GWS may limit, per cell, the maximum number of measurement locations and the maximum number of measurements for each location. The maximum limits may be configurable and may be obtained through simulations and field testing. There can be a maximum of N instance of measurement information for a given cell based on the client device's location. That way the new client devices can pick the measurement details from the client devices that are located closest.

Since propagation environment between a base station of a cell and a client device may change due to mobility and other factors, the measurements made at one point in time may not be usable at much later time. In order to keep or emphasize the most recent measurements, the client devices reporting the measurements in the CD IBI mode file may include a global time stamp, e.g., GMT, for the instant at which the measurements were made. According to an aspect of the present disclosure, the GWS maintaining the CD IBI mode file may apply aging techniques to the measurement data such that the contribution of the older measurement data is deemphasized and the contribution of the newer measurement data is emphasized.

According to the aspect of the present disclosure, the measurements updated by the client devices to the CD IBI mode file may be used by the RAT of the WWAN for enabling Self Organizing Networks (SON) which attempt to simplify and speed up the planning, configuration, management, optimization and healing of the WWAN. The part of SON related to the self-configuration, is automatic neighbor relation (ANR). ANR may significantly reduce the time required to set up a base station by automatically managing neighbor cell relations, thus replacing time-consuming manual setup. ANR relies on the client devices' capability to report measurements on cells that it has detected but that may not be part of the neighbor list broadcasted by the RAT.

Since the measurements in the CD IBI mode file are generated collaboratively, according to an aspect of the present disclosure, their integrity may be partly verified, when required, by the client device by directly performing measurements on cells of the RAT of the WWAN.

According to an aspect of the present disclosure, the GWS hosting the CD IBI mode file need not be controlled, operated, or owned by the WWAN operator. The GWS may be any public server, possibly hosted over a cloud. Some client devices may upload the SI, measurements and other relevant information to the CD IBI mode file on the GWS according to their preference and capability while some other client devices may use the SI, measurements and other information on the CD IBI file on the GWS.

According to an aspect of the present disclosure, the access to the CD IBI mode file on the GWS may be as per the security credentials obtained by a client device based on the normal security procedure it follows when communicating with the WWAN. According to an aspect of the present disclosure, the security credentials for the WWAN IBI mode file and the CD IBI mode file may be separate or may be the same. According to an aspect of the present disclosure, the web servers hosting the WWAN IBI mode file and the CD IBI mode file may be separate or the same web server may host both types of files using different security credentials for each.

According to an aspect of the present disclosure, the WWS may maintain a WWAN IBI file which may include the measurements reported by client devices for their respective serving cells and the neighbor cells. According to an aspect of the present disclosure, the measurements available to the WWAN may be provided by client devices over the RAT of the WWAN. The measurements in the WWAN IBI mode file on WWS are updated and maintained by the WWAN as opposed to the measurements in the CD IBI mode file on GWS which are updated and maintained by the client devices through internet service over alternate network. As in the case of SI messages, the measurements information for each cell from one or more client devices through the RAT of WWAN may be stored in the XML format or other similar such format for flexibility and extensibility. According to an aspect of the present disclosure, one or more client devices may report the measurements, through the RAT of the WWAN, performed by the client devices directly on the cells of a particular RAT on which they may be camped. According to an aspect of the present disclosure, the measurements may be performed on the serving cell as well as the neighbor cells of each client device. According to an aspect of the present disclosure, the client devices may report the measurements, through the RAT of the WWAN, periodically regardless of whether the measured values, such as RSSI, RSRP, RSRQ, etc. have changed or not. According to an aspect of the present disclosure, the client devices may report the measurements, through the RAT of the WWAN, whenever the measured values, such as RSSI, RSRP, RSRQ, etc. meet certain reporting criteria. The reporting criteria may include, for example, a change in value by certain about, e.g., 3 dB change in RSSI.

According to an aspect of the present disclosure, the measurements may be uniquely identified in the WWAN IBI mode file with the combination of PLMN ID, channel number, CID, physical layer cell ID, and location (latitude and longitude of the cell). Note that the client devices performing the measurements on the cells of a RAT may not necessarily have entered the IBI mode of operation. However, some other client devices may have entered the normal or Asynchronous IBI mode of operation. According to an aspect of the present disclosure, a client device that has entered the Asynchronous IBI mode of operation, may receive the measurements on its last serving cell before entering Asynchronous IBI mode as wells as measurements on its neighbor cells from the WWAN IBI mode file on the WWS. Note that the measurements in the WWAN IBI mode file are updated by the WWAN based on reports from client devices through the RAT. The client devices that are in IBI mode may directly access the WWAN IBI mode file on the WWS. Receiving the latest measurements from the WWAN IBI mode file on the WWS enables a client device to not turn on its WWAN modem for measurements purposes.

According to an aspect of the present disclosure, a client device in Asynchronous IBI mode may prefer to receive measurements for cells that are immediately adjacent to its most recent serving cell. According to an aspect of the present disclosure, a client device may prefer to receive measurements for cells that are within a certain distance of its most recent serving cell. According to an aspect of the present disclosure, the client device may periodically check the WWS for any updated measurements in the WWAN IBI mode file. For example, it may check for updated SI in the WWAN IBI mode file whenever it reads the WWAN IBI mode file from the WWS for paging messages. According to an aspect of the present disclosure, the WWS may send a broadcast or multicast message, through alternate network, containing the new measurement for cells to the client devices that were camped on a particular cell and are now in Asynchronous IBI mode with the WWAN. According to an aspect of the present disclosure, the client devices may register with the WWS to get a notification from it whenever the measurements for at least one of the cells in a specified group of cells are updated and have changed as per configured criteria. The availability of latest measurements from multiple other client devices may expedite the cell reselection with the WWAN when the client device needs to get service from it.

Note that in case of SI for each cell in the WWAN IBI mode file, there may be a single set of SIs per cell. However, for the case of measurements, there may be multiple measurements reports from multiple client devices for the same cell. Some of the measurements for the same cell may be from client devices that may be in close proximity to each other or may be from client devices that may be separated by considerable distance. According to an aspect of the present disclosure, the location information associated with each of the measurements reported by each client devices may be used for more targeted purposes. According to an aspect of the present disclosure, the client devices that register with the WWS for receiving measurement data may provide its own location information to the WWS. According to an aspect of the present disclosure, the WWS may be configured to broadcast or multicast the updated measurements data to the client devices that registered to receive the updated measurements only if the measurements were from locations within a very short distance, e.g., 100 meters, from its last known location. The distance criteria for sending the measurements to the client devices may be configurable and the values may be obtained through simulations and field testing.

Since the location of a client device within a cell may vary by any amount, small and large, the number of different measurements to be maintained for each cell for each location may be excessive. According to an aspect of the present disclosure, the WWS may combine, such as average, measurements from different client devices for a given cell for certain locations that are within a small radius of each other. For example, the measurements reported by client devices that are within, e.g., 10 meters, of each other may be combined. According to an aspect of the present disclosure, the GWS discard measurements that may be considered to be outliers. According to an aspect of the present disclosure, there may be a configurable number of measurements data related entries in the WWAN IBI mode file on the WWS. According to an aspect of the present disclosure, a client device reading the measurements information from the WWAN IBI mode file may use measurements from the location closest to its own location. According to an aspect of the present disclosure, the WWS may limit, per cell, the maximum number of measurement locations and the maximum number of measurements for each location. The maximum limits may be configurable and may be obtained through simulations and field testing. There can be a maximum of M instance of measurement information for a given cell based on the client device's location. That way the new client devices can pick the measurement details from the client devices that are located closest.

According to an aspect of the present disclosure, the WWS may either maintain the WWAN IBI mode file according to the CID of the cells or it may maintain the file according to location of the reported measurements. According to an aspect of the present disclosure, if the WWS maintains the WWAN IBI mode file according to CID then it may maintain multiple records in the file for different measurements corresponding to different locations. Note that the different measurements for the cell with the same CID may have been reported by different client devices or the same client device. According to an aspect of the present disclosure, if the WWS maintains the WWAN IBI mode file according to the location of the reported measurement, it may maintain the CID of the cells in the record for measurements corresponding to the location.

According to the aspect of the present disclosure, the measurements updated by the client devices to the WWAN IBI mode file may be used by the RAT of the WWAN for enabling SON which attempt to simplify and speed up the planning, configuration, management, optimization and healing of the WWAN.

For a client device that is in stationary or moves around only within a TAI of a WWAN, it may not need to perform a TAI update procedure except for the periodic TAU procedure. The TAU procedure involves transmission in uplink in addition to the receive operation with the WWAN. The uplink transmission may contribute much more to power consumption of a client device than the downlink reception. According to an aspect of the present disclosure, a client device may enter the IBI mode of operation with the WWAN by using internet service from alternate network and then may perform the periodic TAU procedure with the WWAN using internet service from the alternate network and keeping the WWAN modem powered off.

According to an aspect of the present disclosure, the client device that is in IBI mode of operation may be able to determine whether it is stationary or mobile while keeping its WWAN modem powered off, without using any Global Navigation Satellite System (GNSS) receiver for determining and tracking its location, by keeping track of the characteristics of the alternate network from which it may be receiving internet service. For example, if the alternate network for internet service is an Ethernet network, the client device in IBI mode may consider itself to be stationary as long as it is connected to the same Ethernet network. In another example, if a client device is connected to a particular WLAN, the client device in IBI mode may consider itself stationary as long as it is connected to the same WLAN. In another example, the client device in IBI mode of operation may keep track of its location based on whether its IP address with the alternate network is the same or changed. If the client device's IP address remains the same since the beginning of the IBI mode of operation, the client device may consider itself to be stationary. According to an aspect of the present disclosure, a client device in IBI mode may request the router of the alternate network to provide with location of the client device's location. The alternate network may have its location known a priori and it may make additional measurements on the signal received from the client device to determine its location. According to an aspect of the present disclosure, a client device may use the location information, which it may obtain from the router or another entity of the alternate network, to include in the periodic TAU procedure in IBI mode of operation through the internet service from the alternate network. According to an aspect of the present disclosure, upon receiving the TAU procedure request from a client device that includes the client device's location information, the WWAN may determine to proceed with the periodic TAU procedure if the reported location by the client device corresponds to the same TAI as the last known TAI of the client device when it entered the IBI mode. According to an aspect of the present disclosure, upon receiving the TAU procedure request from a client device that includes the client device's location information, the WWAN may determine to reject the periodic TAU procedure if the reported location by the client device corresponds to a TAI different from the last known TAI of the client device when it entered the IBI mode. Furthermore, according to an aspect of the present disclosure, the WWAN may request the client device to perform TAU procedure through the RAT by powering on its WWAN modem and synchronizing to a suitable cell and then proceeding with the TAU procedure. Alternatively, according to an aspect of the present disclosure, the WWAN may request the client device to first determine the CID of the suitable cell by powering on its WWAN modem and then perform the TAU procedure through the internet service from the alternate network while keeping the WWAN modem powered off.

In some cases a client device may be receiving internet service from an alternate network that may be mobile. For example, the alternate network could be a mobile Hotspot. The mobile Hotspot may be inside an automobile, a bus, a train, etc. In this case, even though a client device may be connected to the same WLAN with the same IP address, the client device may be actually mobile. In such a case, the client device may need to do TAU procedure due to change of TAI that may inevitably occur due to the mobility of the alternate network. According to an aspect of the present disclosure, a client device in IBI mode may periodically query a mobile Hotspot for its current serving cell information such as CID and TAI. According to an aspect of the present disclosure, after the client device in IBI mode receives the information about the serving cell of the mobile Hotspot, it may use that as a proxy for its own location and may report the CID and TAI in the TAU procedure request to the WWAN. The further steps for TAU procedure (periodic or due to TAI change) follow as per the earlier description.

According to an aspect of the present disclosure, for the periodic registration update or the registration update due to change of registration area, a client device in IBI mode may follow similar steps as for the TAU procedure by determining and including the location of the alternate network in the registration update procedure request through the internet service of the alternate network. According to an aspect of the present disclosure, in case of mobile Hotspot as alternate network, the client device may query the location of the mobile Hotspot and the cell information such as CID, TAI, LAC and may include that information in the registration update request to the WWAN though the internet service from the alternate network. Although the location information of the mobile Hotspot may be always used, the use of the CID, TAI, and LAC is possible only if the client device and the mobile Hotspot belong to the same RAT of the same WWAN. In the absence of the CID, TAI, and LAC of the cell on which the mobile Hotspot is camped, the WWAN may determine the corresponding CID, TAI and LAC of the client device based only on the location of the mobile Hotspot.

A client device may perform TAU with the WWAN irrespective of whether the client device is in IBI mode or asynchronous IBI mode. According to an aspect of the present disclosure, when the client device is in asynchronous IBI mode of operation, the client device may update its record in the WWAN IBI mode file with global time stamp, current location details, and other known WWAN details such as TAI, etc. According to an aspect of the present disclosure, the WWAN may read the client record in the WWAN IBI mode file periodically to check for the updates from the client device on the TAU. According to an aspect of the present disclosure, when the client device updates its record in the WWAN IBI mode file, the WWS may send a notification to the WWAN as well.

According to an aspect of the present disclosure, when a client device performs the TAU through alternate network internet connection, based on the current location of the client device, the WWAN may associate or register the client device with the nearby cell. According to an aspect of the present disclosure, if the client device is allowed to roam then the WWAN may register the client device with a cell in the same WWAN or with different WWAN depending on the current location of the client device and the availability of service from one or more WWAN. According to an aspect of the present disclosure, the WWAN may notify the client device about the change in registration with new cell and may communicate the new details of the new WWAN and CID details to the client device in the notification.

The above method of TAU allows the WWAN to track a client device even when the client device is not directly camped on or connected with the WWAN. The client device may keep their location updated to the WWAN as long as the client device has internet connection and have access to the WWS. This may enable the WWAN to send other notification events such as Earthquake and Tsunami Warning System (ETWS), Commercial Mobile Alert System (CMAS), and other alert messages, if any, which may need to be sent to the client device when the client device is IBI mode.

According to an aspect of the present disclosure, the WWAN and the client device may establish the Serving WWAN Asynchronous Internet Based Idle (SWAIBI) mode of operation when the client device has internet service through WWAN. According to an aspect of the present disclosure, in SWAIBI mode, the client device may only decode the dedicated unicast channels from the WWAN and may neither decode the broadcast channel for SI messages nor multicast channel for paging messages from the WWAN. Since the WWAN network may keep the SI and paging messages updated in the WWS, according to an aspects of the present disclosure, the client devices that are in connected mode with the WWAN may get the SI and paging message updates for the serving cell and/or SI message updates for neighbor cells from the WWS. This may enable a client device to avoid decoding SI and paging message channels for the serving cell and neighbor cells. The SWAIBI mode is also applicable for the client devices with multi-RAT capability. According to an aspect of the present disclosure, when a client device is in connected mode with one RAT of a WWAN, the client device may get into the SWAIBI mode when in connected mode with one RAT of the WWAN to receive the SI and paging messages for the other RATs of the same WWAN through the WWS. This may enable a client device to avoid synchronization to and decoding of the SI and paging messages of the other RATs.

Figure 13:
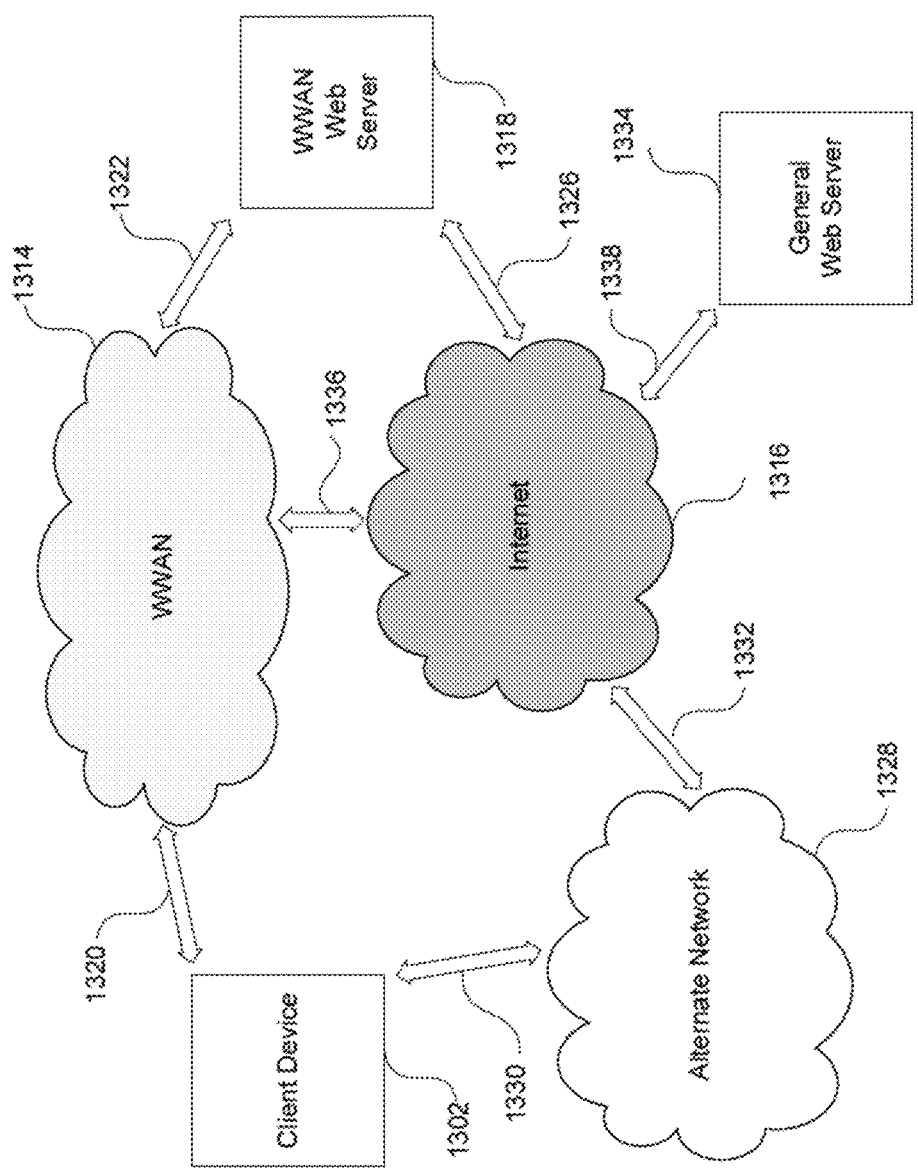
FIG. 13 illustrates the asynchronous IBI mode use case with both the WWS and the GWS and the alternate source of internet according to the aspects of the present disclosure.

According to an aspect of the present disclosure, a client device may be in asynchronous IBI mode of operation with the WWS and GWS simultaneously. For example, a client device may be in asynchronous IBI mode of operation with the WWS for receiving paging and SI messages while it may be in asynchronous IBI mode of operation with the GWS for measurements purposes. The concurrent asynchronous IBI mode with two different web servers is illustrated in FIG. 13 where both the WWS 1318 and the GWS 1334 may be used and they may be connected to the internet through their separate interfaces 1326 and 1338 respectively. While the WWS 1318 may be connected to the WWAN 1314 through the interface 1322, the GWS 1334 is not directly connected to the WWAN 1314. However, the WWAN 1314 may always be able to communicate with the GWS 1334 through the internet. This method of communication may be used by the WWAN 1314, for example, to read the measurement reports that may be updated by client devices in the CD IBI mode file on the GWS 1334.

By way of example only, the above-described method for IBI mode operation may be implemented in the CIBI Controller processing block of a client device such as 802 in FIG. 8. The CIBI processing block 832 in the client device 802 may include processing methods for different modes of operation such as IBI mode, asynchronous IBI mode and SWAIBI mode as well as protocol interactions with different web servers and files such as WWAN IBI file, CD IBI file, WWS and the GWS.

Figure 14:
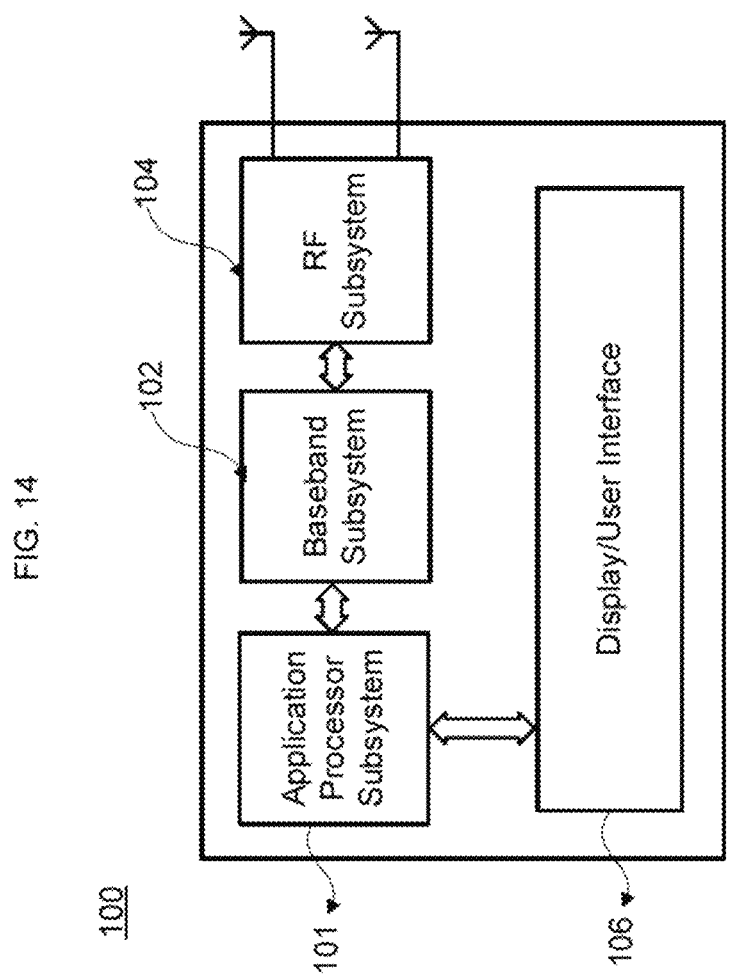
FIG. 14 illustrates a wireless mobile station diagram, which may be employed with aspects of the disclosure described herein.
Figure 15:
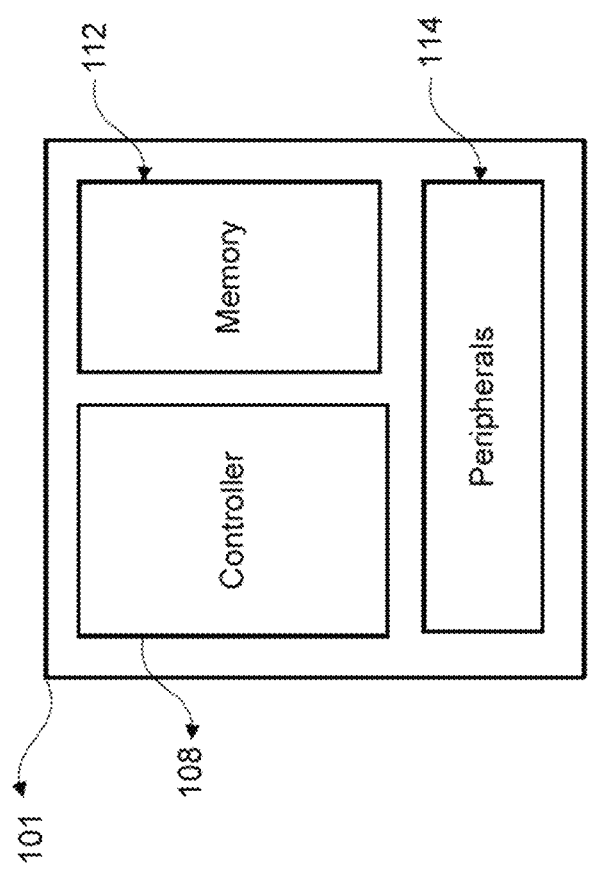
FIG. 15 illustrates an application processor subsystem for a wireless mobile station, which may be employed with aspects of the disclosure described herein.

As shown in FIG. 14, client device 100 may include an application processor subsystem 101, baseband subsystem 102 and a radio frequency (RF) subsystem 104 for use with a wireless communication network. A display/user interface 106 provides information to and receives input from the user. By way of example, the user interface may include one or more actuators, a speaker and a microphone. In some mobile devices, certain combination of the application processor subsystem 101, the baseband subsystem 102 and the RF subsystem 104 may all be integrated as one integrated chip. The application processor subsystem 101 of FIG. 14 as detailed in FIG. 15 may include a controller 108 such as a microcontroller, another processor or other circuitry, memory 112 and peripherals 114. The controller 108 desirably handles overall operation of the client device 100. This may be done by any combination of hardware, software and firmware running on the controller 108. Such a combination of hardware, software and firmware may embody any methods in accordance with aspects of the present disclosure. In FIG. 15, the peripherals 114 such as a full or partial keyboard, video or still image display, audio interface, one or more SIM interfaces, etc. may be employed and managed through the controller 108.

Figure 16:
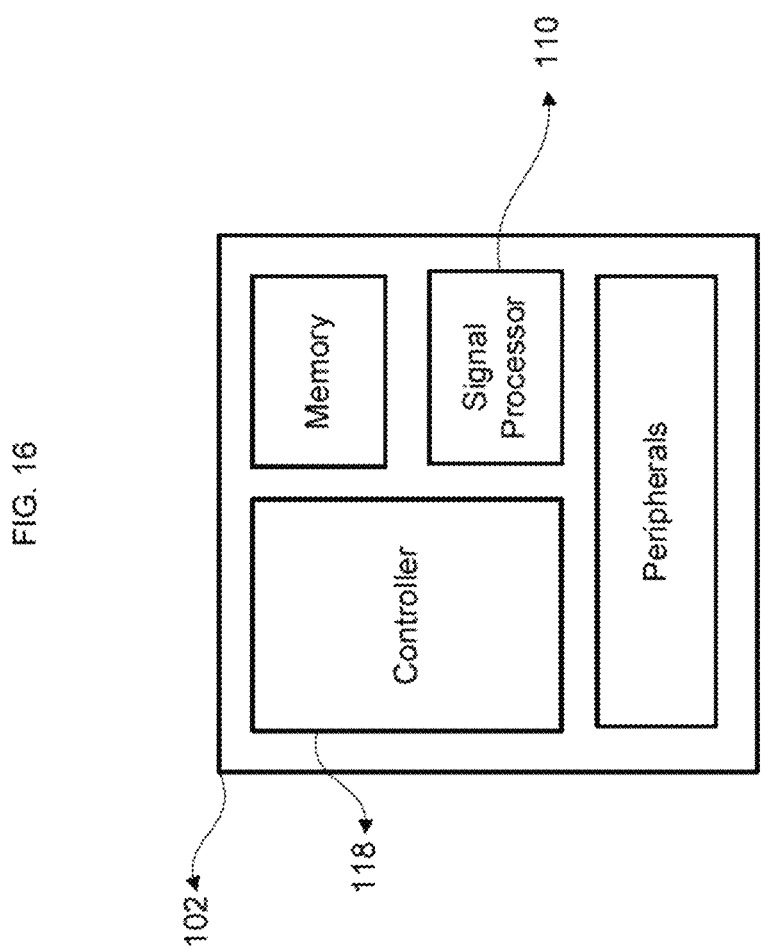
FIG. 16 illustrates a baseband subsystem for a wireless mobile station, which may be employed with aspects of the disclosure described herein.

The baseband subsystem 102 of FIG. 14 as detailed in FIG. 16 may include a controller 118 such as a microcontroller or other processor, a signal processor 110, memory, and peripherals. Aspects of the present disclosure may be implemented in firmware of the controller 108 of the application processor in FIG. 15 and/or the controller 118 of the baseband subsystem in FIG. 16. In another alternative, aspects of the present disclosure may also be implemented as a combination of firmware and hardware of the application processor subsystem 101 of FIG. 15 and/or the baseband subsystem 102 of FIG. 16. For instance, a signal processing entity of any or all of the FIG. 16 may be implemented in firmware, hardware and/or software. It may be part of the baseband subsystem, the receiver subsystem or be associated with both subsystems. In one example, the controller 118 and/or the signal processor 110 in FIG. 16 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

Figure 17:
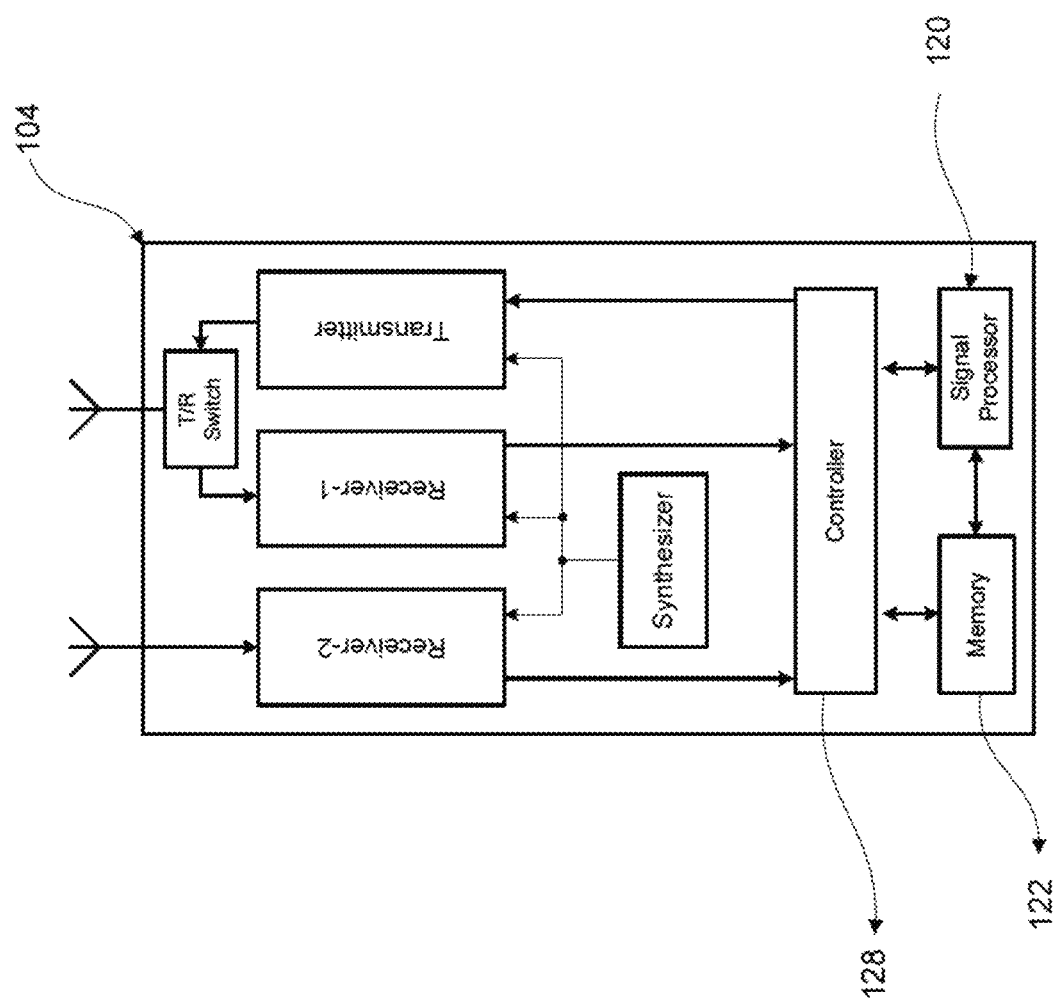
FIG. 17 illustrates a radio frequency (RF) subsystem for a wireless mobile station, which may be employed with aspects of the disclosure described herein.

The RF subsystem 104 of FIG. 14 as detailed in FIG. 17 may include a controller 128 such as a microcontroller, another processor or other circuitry. It may include memory 122 and a signal processor 120.

The consumer electronics devices that may use this disclosure may include smartphones, tablets, laptops, gaming consoles, cameras, video camcorders, car entertainment systems, etc.

Figure 18:
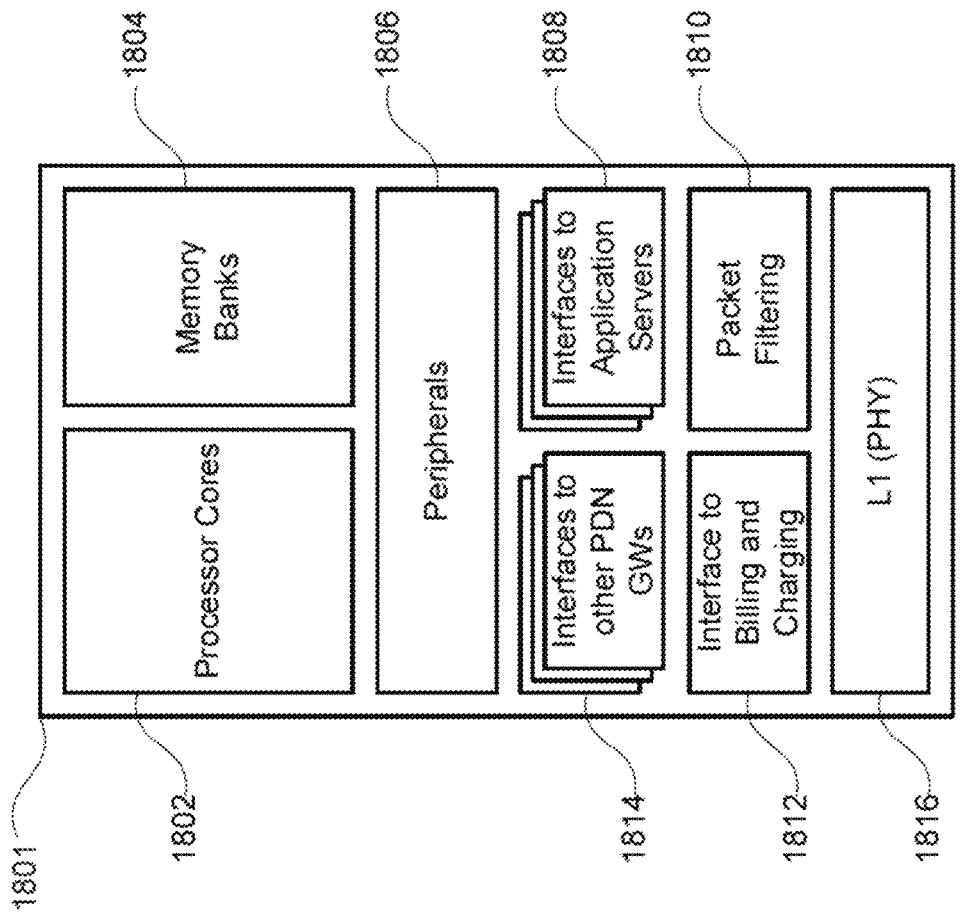
FIG. 18 illustrates a Packet Data Network (PDN) Gateway (GW) block diagram, which may be employed with aspects of the disclosure described herein.

By way of example only, the above-described method for IBI mode operation may be implemented in the NIBI Controller processing block of a PDN GW such as 812 in FIG. 8. In addition to the NIBI Controller processing block, a PDN GW may support mobility between 3GPP and non-3GPP networks. A PDN GW of a network may provide connectivity from client devices to other PDNs, such as internet, by being the point of entry or exit of data packet traffic. The PDN GW functions may include: per-user based data packet filtering, Lawful Interception (LI), client device IP address allocation, transport level data packet marking in the uplink and downlink, e.g. for QoS, accounting for inter-operator charging, uplink and downlink service level charging, uplink and downlink service level gating control, uplink and downlink service level rate enforcement. A block diagram of an example PDN GW is illustrated in FIG. 18. As shown in FIG. 18, a PDN GW 1801 may include one or more processor cores 1802, memory banks 1804, and peripherals 1806. In addition a PDN GW may include one or more "Interfaces to other PDN GWs" 1814 and one or more "Interfaces to Application Servers" 1808. A PDN GW may include "Interface to Billing and Charging" 1812 for communicating with corresponding processing entities of a network. While many of the functions of a PDN GW may be implemented in software, some processing function may be implemented in hardware, e.g., the per-user data packet filtering may be implemented in "Packet Filtering" hardware block 1810. Similarly, the processing block L1 (PHY) 1816 may be a hardware block performing the layer 1 (physical layer) processing. Alternatively, some of the processing may be performed in a signal processor, an FPGA or an ASIC. The NIBI Controller processing block may be implemented as software, hardware or some combination of the two and the hardware may be a signal processor, FPGA, or ASIC. Some of the hardware blocks may include the RF, antennas, and other analog components. Some of the interfaces of the PDN GW may be wireless and some may be wire-line including optical fiber. Some of the wireless interfaces may use line-of-sight (LOS) microwave links.

Figure 19:
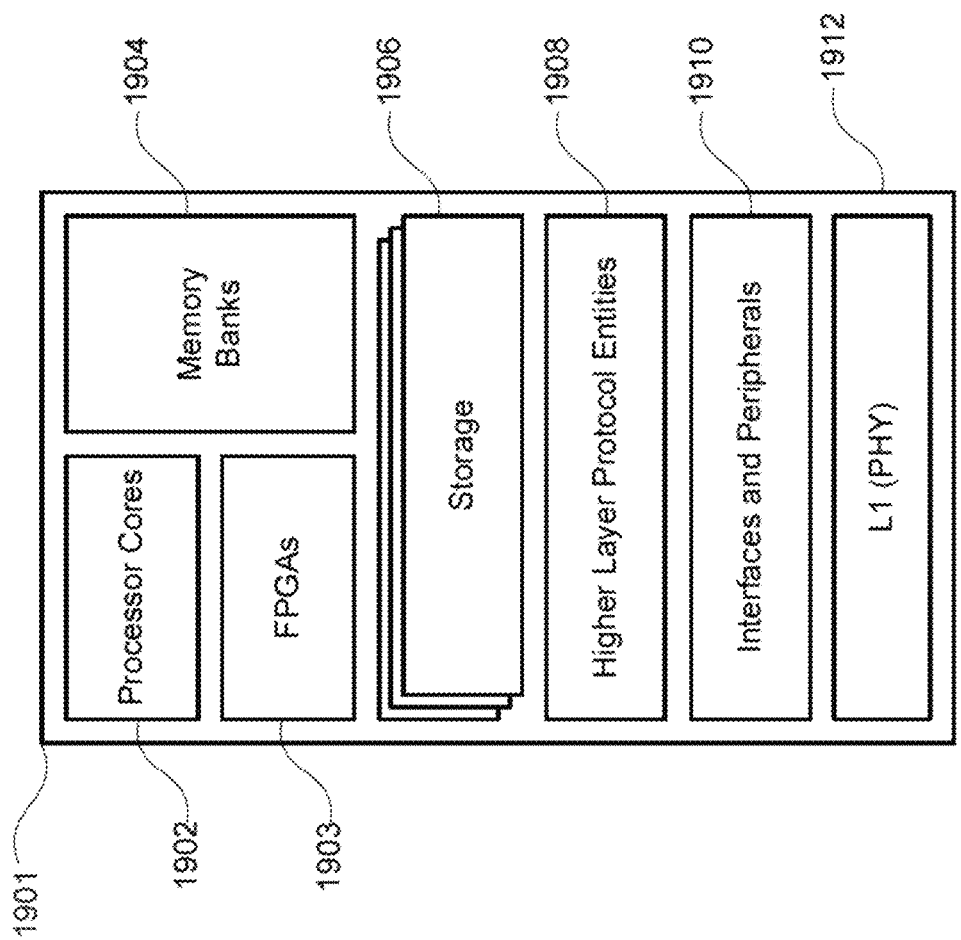
FIG. 19 illustrates a web server block diagram, which may be employed with aspects of the disclosure described herein.

By way of example only, the above-described method for asynchronous IBI mode operation may be implemented in a WWS 1318 and/or a GWS 1334 as illustrated in FIG. 13. The web servers may be a standard web server used for general purpose networking and computing. The asynchronous IBI mode processing blocks may be implemented in software, hardware or combination of the two. A block diagram of a web server which may be used for WWS or GWS is illustrated in FIG. 19. The web server 1901 may include one or more processor cores 1902, one or more FPGAs 1903, memory banks 1904, and storage elements 1906. The storage elements may be conventional hard disks or solid state hard disks and they may have redundancy and other robustness measures built against disk failures. The web server may also include the hardware and software for interfacing and communicating with the internet which include Layer 1 (L1) or Physical layer (PHY) processing block 1912, Interfaces and Peripherals 1910 and the higher layer protocol entities 1908. The asynchronous IBI mode processing may take place in the processor cores 1902 and/or the FPGAs 1903 both of which may use the memory banks 1904 for the temporary and long term storage. The WWAN IBI mode file and the CD IBI mode files may be located in the storage elements 1906 or may be located in the memory banks 1904 for faster access.

Although the disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims. Aspects of each embodiment may be employed in other embodiments described herein.

The invention claimed is:

1. A method for internet based wireless communication, the method comprising:

controlling, by a processing device at a Wireless Wide Area Network (WWAN),
- establishing an Internet Based Idle (IBI) mode of operation with a client device connectable to the WWAN for obtaining internet service, when the client device has internet service through an another network other than the WWAN,
- wherein the establishing the IBI mode includes
- receiving, from the client device through a Radio Access Technology (RAT) and a serving Gateway (GW) of the WWAN, first information about a current internet connection of the client device with the another network, and a request for the WWAN to enter the IBI mode to perform an idle Radio Resource Management (RRM) procedure via the internet service of the another network;
- determining whether to accept, modify or reject the request to enter the IBI mode;
- responding to the request to enter the IBI mode with a response transmitted over at least one of the WWAN or the another network; and
- receiving a confirmation message from the client device for the response over at least one of the another network or the WWAN,
- in which, in the establishing the IBI mode or in the IBI mode, communication between a Packet Data Network (PDN) GW of the WWAN and a PDN GW of the another network is through an interface between the PDN GW of the another network and the PDN GW of the WWAN.

2. The method of claim 1, further comprising:
controlling, by the processing device, receiving at least one of information about Client Device Identity (CDI) of the client device or a current serving cell identity (CID) of the client device, when the request to enter the IBI mode is received.

3. The method of claim 1,
wherein, when the response is to accept or modify the request to enter the IBI mode, the response is transmitted at least through the another network.

4. The method of claim 1, further comprising:
controlling, by the processing device, when a message transmission failure is determined at the WWAN for a given message from the WWAN and the given message has been transmitted less than a predetermined number of times, re-transmitting the given message.

5. The method of claim 4, wherein the given message is re-transmitted based on expiry of a timer which is started at time of a previous transmission of the given message.

6. The method of claim 1, further comprising:
controlling, by the processing device, when in the IBI mode, initiating a given communication with the client device through the another network.

7. The method of claim 1, further comprising:
controlling, by the processing device, when in the IBI mode, transmitting a paging message to the client device through the another network.

8. The method of claim 7, further comprising:
controlling, by the processing device, synchronizing with the client device and, when the client device and the WWAN are synchronized, receiving a response to the paging message according to a given RAT of the WWAN.

9. The method of claim 7, further comprising:
controlling, by the processing device, transmitting to the client device second information including details about a dedicated uplink resource in which the client device is to perform a procedure for paging response.

10. The method of claim 7, further comprising:
controlling, by the processing device, during the establishing the IBI mode, negotiating with the client device whether the client device is to wait for dedicated resource allocation for paging response or to initiate a contention based random access procedure in an uplink to the WWAN for responding to the paging message.

11. The method of claim 1, wherein the processing device is a Network IBI (NIBI) Controller in the PDN GW of the WWAN.

12. The method of claim 11, further comprising:
controlling, by the processing device, for the IBI mode, establishing a first logical connection of the NIBI Controller with a Client IBI (CIBI) controller of the client device, through the serving GW and the RAT of the WWAN and a WWAN modem of the client device.

13. The method of claim 12, wherein the first logical connection is based on Internet Protocol (IP) data packets or a predetermined IP.

14. The method of claim 12, further comprising:
controlling, by the processing device, in the IBI mode, establishing a second logical connection of the NIBI Controller with the CIBI controller of the client device, through the PDN GW, one of a Digital Subscriber Line Access Multiplexer (DSLAM), a Broadband Remote Access Server (BRAS) and a Cable Modem Termination System (CMTS), and a Hotspot Access Point of the another network, and a WLAN modem of the client device.

15. The method of claim 14, wherein the second logical connection is based on IP data packets or a predetermined IP.

16. The method of claim 14, wherein any given message exchange between the CIBI controller and the NIBI controller is over one of the first and second logical connections.

17. The method of claim 1, wherein, when the interface is a direct interface, the establishing the IBI mode includes receiving, from the client device through the RAT and the serving GW of the WWAN, an Internet Protocol (IP) address of the PDN GW of the another network, and
in which, in the establishing the IBI mode or in the IBI mode, the communication between the PDN GW of the another network and the PDN of the WWAN is with the PDN GW of the another network at the IP address thereof.

18. The method of claim 17, wherein the direct interface is wireless or wired.

19. The method of claim 1, wherein, when the interface is indirect and includes an internet network, in the establishing the IBI mode or in the IBI mode, the communication is between a Network IBI (NIBI) controller as the processing device and the client device, over the internet network and via the PDN GW of the another network and using an Internet Protocol (IP) address of the client device.

20. The method of claim 19, wherein the another network is a Wireless Local Area Network (WLAN).

21. The method of claim 1, further comprising:
controlling, by the processing device, establishing with the client device a Serving WWAN Internet Based Idle (SWIBI) mode of operation when the client device has the internet service through the WWAN,
in which in the SWIBI mode, the client device only decodes a dedicated unicast channel from the WWAN and does not decode a broadcast channel for a system information (SI) message or a multicast channel for a paging message from the WWAN.

22. The method of claim 21, further comprising:
controlling, by the processing device, when the client device is in a connected mode with the WWAN and in the SWIBI mode, transmitting, over the internet service from the another network, a given SI message and a given paging message update for at least one of a serving cell of the client device or a given SI message update for a neighbor cell.

23. The method of claim 21, further comprising:
controlling, by the processing device, when the client device is in a connected mode with a given RAT of the WWAN and in the SWIBI mode, transmitting to the client device, over the internet service from the another network, given SI and given paging messages for another RAT of the WWAN.

24. An apparatus for internet based wireless communication, the apparatus comprising:
circuitry configured to control at a Wireless Wide Area Network (WWAN),
  establishing an Internet Based Idle (IBI) mode of operation with a client device connectable to the WWAN for obtaining internet service, when the client device has internet service through an another network other than the WWAN,
  wherein the establishing the IBI mode includes
  receiving, from the client device through a Radio Access Technology (RAT) and a serving Gateway (GW) of the WWAN, first information about a current internet connection of the client device with the another network, and a request for the WWAN to enter the IBI mode to perform an idle Radio Resource Management (RRM) procedure via the internet service of the another network;
  determining whether to accept, modify or reject the request to enter the IBI mode;
  responding to the request to enter the IBI mode with a response transmitted over at least one of the WWAN or the another network; and
  receiving a confirmation message from the client device for the response over at least one of the another network or the WWAN,
  in which, in the establishing the IBI mode or in the IBI mode, communication between a Packet Data Network (PDN) GW of the WWAN and a PDN GW of the another network is through an interface between the PDN GW of the another network and the PDN GW of the WWAN.

25. A wireless communication device at a Wireless Wide Area Network (WWAN), the wireless communication device comprising:
a receiver to receive a wireless communication; and
a processing device configured for internet based wireless communication,
wherein the processing is configured to control at the WWAN,
  establishing an Internet Based Idle (IBI) mode of operation with a client device connectable to the WWAN for obtaining internet service, when the client device has internet service through an another network other than the WWAN,
  wherein the establishing the IBI mode includes
  receiving, from the client device through a Radio Access Technology (RAT) and a serving Gateway (GW) of the WWAN, first information about a current internet connection of the client device with the another network, and a request for the WWAN to enter the IBI mode to perform an idle Radio Resource Management (RRM) procedure via the internet service of the another network;
  determining whether to accept, modify or reject the request to enter the IBI mode;
  responding to the request to enter the IBI mode with a response transmitted over at least one of the WWAN or the another network; and
  receiving a confirmation message from the client device for the response over at least one of the another network or the WWAN,
in which, in the establishing the IBI mode or in the IBI mode, communication between a Packet Data Network (PDN) GW of the WWAN and a PDN GW of the another network is through an interface between the PDN GW of the another network and the PDN GW of the WWAN.

* * * * *